United States Patent
van der Schaar et al.

(10) Patent No.: US 11,711,552 B2
(45) Date of Patent: *Jul. 25, 2023

(54) SYSTEMS AND METHODS FOR ENCODING AND PLAYING BACK VIDEO AT DIFFERENT FRAME RATES USING ENHANCEMENT LAYERS

(71) Applicant: DIVX, LLC, San Diego, CA (US)

(72) Inventors: Auke Sjoerd van der Schaar, London (GB); John Funnell, Chandlers Ford (GB)

(73) Assignee: DIVX, LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/146,210

(22) Filed: Jan. 11, 2021

(65) Prior Publication Data
US 2021/0136429 A1 May 6, 2021

Related U.S. Application Data

(63) Continuation of application No. 16/436,429, filed on Jun. 10, 2019, now Pat. No. 10,893,305, which is a
(Continued)

(51) Int. Cl.
*H04N 7/173* (2011.01)
*H04N 21/2343* (2011.01)
(Continued)

(52) U.S. Cl.
CPC ......... *H04N 21/234381* (2013.01); *H04N 21/234327* (2013.01); *H04N 21/25825* (2013.01); *H04N 21/6587* (2013.01); *H04N 21/85406* (2013.01)

(58) Field of Classification Search
CPC ....... H04N 21/234381; H04N 21/6587; H04N 21/85406; H04N 21/234327; H04N 21/25825
See application file for complete search history.

(56) References Cited

U.S. PATENT DOCUMENTS 4,009,331 A 2/1977 Goldmark et al.
4,694,357 A 9/1987 Rahman et al.
(Continued)

FOREIGN PATENT DOCUMENTS

AU 2010203605 B2 5/2015
CA 2237293 A1 7/1997
(Continued)

OTHER PUBLICATIONS

Extended European Search Report for European Application No. 20172313.7 Search completed Aug. 19, 2020, dated Aug. 27, 2020, 11 Pgs.
(Continued)

*Primary Examiner* — John R Schnurr
(74) *Attorney, Agent, or Firm* — KPPB LLP

(57) ABSTRACT

Systems and methods in accordance with embodiments of this invention provide for encoding and playing back video at different frame rates using enhancement layers. In a number of embodiments, video is encoded using temporal scalability involving the creation of a base layer at a first frame rate and an enhancement layer including additional frames enabling playback at a second higher frame rate. The second higher frame rate can also be referred to as an enhanced frame rate. In a number of embodiments, the base and enhancement layers are stored in one or more container files that contain metadata describing the enhancement layer. Based on the capabilities of a playback device, it can select the particular frame rate at which to playback encoded video.

9 Claims, 14 Drawing Sheets

Related U.S. Application Data continuation of application No. 15/863,456, filed on Jan. 5, 2018, now Pat. No. 10,321,168, which is a continuation of application No. 14/679,469, filed on Apr. 6, 2015, now Pat. No. 9,866,878.

(60) Provisional application No. 61/975,789, filed on Apr. 5, 2014.

(51) Int. Cl.
*H04N 21/258* (2011.01)
*H04N 21/6587* (2011.01)
*H04N 21/854* (2011.01)

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,400,401 A | 3/1995 | Wasilewski et al. |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,574,785 A | 11/1996 | Ueno et al. |
| 5,583,652 A | 12/1996 | Ware |
| 5,589,993 A | 12/1996 | Naimpally et al. |
| 5,600,721 A | 2/1997 | Kitazato |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,642,338 A | 6/1997 | Fukushima et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A | 5/1998 | Ryan et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,813,010 A | 9/1998 | Kurano et al. |
| 5,819,160 A | 10/1998 | Foladare et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,854,873 A | 12/1998 | Mori et al. |
| 5,867,625 A | 2/1999 | McLaren |
| 5,887,110 A | 3/1999 | Sakamoto et al. |
| 5,892,900 A | 4/1999 | Ginter et al. |
| 5,903,261 A | 5/1999 | Walsh et al. |
| 5,907,597 A | 5/1999 | Mark |
| 5,907,658 A | 5/1999 | Murase et al. |
| 5,923,869 A | 7/1999 | Kashiwagi et al. |
| 5,946,446 A | 8/1999 | Yanagihara |
| 5,956,729 A | 9/1999 | Goetz et al. |
| 5,959,690 A | 9/1999 | Toebes, VIII et al. |
| 5,970,147 A | 10/1999 | Davis |
| 5,999,812 A | 12/1999 | Himsworth |
| 6,002,834 A | 12/1999 | Hirabayashi et al. |
| 6,009,237 A | 12/1999 | Hirabayashi et al. |
| 6,016,381 A | 1/2000 | Taira et al. |
| 6,018,611 A | 1/2000 | Nogami et al. |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,057,832 A | 5/2000 | Lev et al. |
| 6,058,240 A | 5/2000 | McLaren |
| 6,064,794 A | 5/2000 | McLaren et al. |
| 6,065,050 A | 5/2000 | DeMoney |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 | 1/2001 | Rosen |
| 6,195,388 B1 | 2/2001 | Choi et al. |
| 6,204,883 B1 | 3/2001 | Tsukagoshi |
| 6,222,981 B1 | 4/2001 | Rijckaert |
| 6,266,483 B1 | 7/2001 | Okada et al. |
| 6,282,320 B1 | 8/2001 | Hasegawa et al. |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,320,905 B1 | 11/2001 | Konstantinides |
| 6,330,286 B1 | 12/2001 | Lyons et al. |
| 6,351,538 B1 | 2/2002 | Uz |
| 6,373,803 B2 | 4/2002 | Ando et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,415,031 B1 | 7/2002 | Colligan et al. |
| 6,418,270 B1 | 7/2002 | Steenhof et al. |
| 6,441,754 B1 | 8/2002 | Wang et al. |
| 6,445,877 B1 | 9/2002 | Okada et al. |
| 6,449,719 B1 | 9/2002 | Baker |
| 6,453,115 B1 | 9/2002 | Boyle |
| 6,453,116 B1 | 9/2002 | Ando et al. |
| 6,466,671 B1 | 10/2002 | Maillard et al. |
| 6,466,733 B1 | 10/2002 | Kim |
| 6,504,873 B1 | 1/2003 | Vehvilaeinen |
| 6,510,513 B1 | 1/2003 | Danieli |
| 6,510,554 B1 | 1/2003 | Gordon et al. |
| 6,512,883 B2 | 1/2003 | Shim et al. |
| 6,532,262 B1 | 3/2003 | Fukuda et al. |
| 6,594,699 B1 | 7/2003 | Sahai et al. |
| 6,621,979 B1 | 9/2003 | Eerenberg et al. |
| 6,625,320 B1 | 9/2003 | Nilsson et al. |
| 6,654,933 B1 | 11/2003 | Abbott et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,690,838 B2 | 2/2004 | Zhou |
| 6,697,568 B1 | 2/2004 | Kaku |
| 6,714,909 B1 | 3/2004 | Gibbon et al. |
| 6,724,944 B1 | 4/2004 | Kalevo et al. |
| 6,725,281 B1 | 4/2004 | Zintel et al. |
| 6,751,623 B1 | 6/2004 | Basso et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,813,437 B2 | 11/2004 | Ando et al. |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,868,525 B1 | 3/2005 | Szabo |

(56) References Cited

U.S. PATENT DOCUMENTS

| | | |
|---|---|---|
| 6,871,006 B1 | 3/2005 | Oguz et al. |
| 6,912,513 B1 | 6/2005 | Candelore |
| 6,917,652 B2 | 7/2005 | Lyu |
| 6,931,531 B1 | 8/2005 | Takahashi |
| 6,944,621 B1 | 9/2005 | Collart |
| 6,944,629 B1 | 9/2005 | Shioi et al. |
| 6,956,901 B2 | 10/2005 | Boroczky et al. |
| 6,957,350 B1 | 10/2005 | Demos |
| 6,965,724 B1 | 11/2005 | Boccon-Gibod et al. |
| 6,965,993 B2 | 11/2005 | Baker |
| 6,970,564 B1 | 11/2005 | Kubota et al. |
| 6,983,079 B2 | 1/2006 | Kim |
| 6,985,588 B1 | 1/2006 | Glick et al. |
| 6,988,144 B1 | 1/2006 | Luken et al. |
| 7,006,757 B2 | 2/2006 | Ando et al. |
| 7,007,170 B2 | 2/2006 | Morten |
| 7,020,287 B2 | 3/2006 | Unger |
| 7,023,924 B1 | 4/2006 | Keller et al. |
| 7,043,473 B1 | 5/2006 | Rassool et al. |
| 7,054,968 B2 | 5/2006 | Shrader et al. |
| 7,103,906 B1 | 9/2006 | Katz et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,181,438 B1 | 2/2007 | Szabo |
| 7,185,363 B1 | 2/2007 | Narin et al. |
| 7,188,183 B1 | 3/2007 | Paul et al. |
| 7,191,335 B1 | 3/2007 | Maillard |
| 7,197,234 B1 | 3/2007 | Chatterton |
| 7,206,940 B2 | 4/2007 | Evans et al. |
| 7,209,892 B1 | 4/2007 | Galuten et al. |
| 7,212,726 B2 | 5/2007 | Zetts |
| 7,231,132 B1 | 6/2007 | Davenport |
| 7,237,061 B1 | 6/2007 | Boic |
| 7,242,772 B1 | 7/2007 | Tehranchi |
| 7,243,346 B1 | 7/2007 | Seth et al. |
| 7,274,861 B2 | 9/2007 | Yahata et al. |
| 7,295,673 B2 | 11/2007 | Grab et al. |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,352,956 B1 | 4/2008 | Winter et al. |
| 7,356,143 B2 | 4/2008 | Morten |
| 7,356,245 B2 | 4/2008 | Belknap et al. |
| 7,366,788 B2 | 4/2008 | Jones et al. |
| 7,376,831 B2 | 5/2008 | Kollmyer et al. |
| 7,382,879 B1 | 6/2008 | Miller |
| 7,397,853 B2 | 7/2008 | Kwon et al. |
| 7,400,679 B2 | 7/2008 | Kwon et al. |
| 7,406,174 B2 | 7/2008 | Palmer |
| 7,418,132 B2 | 8/2008 | Hoshuyama |
| 7,421,411 B2 | 9/2008 | Kontio et al. |
| 7,454,780 B2 | 11/2008 | Katsube et al. |
| 7,457,359 B2 | 11/2008 | Mabey et al. |
| 7,457,415 B2 | 11/2008 | Reitmeier et al. |
| 7,460,668 B2 | 12/2008 | Grab et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,930 B2 | 3/2009 | Naka et al. |
| 7,499,938 B2 | 3/2009 | Collart |
| 7,515,710 B2 | 4/2009 | Russell et al. |
| 7,526,450 B2 | 4/2009 | Hughes et al. |
| 7,546,641 B2 | 6/2009 | Robert et al. |
| 7,594,271 B2 | 9/2009 | Zhuk et al. |
| 7,610,365 B1 | 10/2009 | Kraft et al. |
| 7,639,921 B2 | 12/2009 | Seo et al. |
| 7,640,435 B2 | 12/2009 | Morten |
| 7,676,555 B2 | 3/2010 | Bushee et al. |
| 7,689,510 B2 | 3/2010 | Lamkin et al. |
| 7,711,052 B2 | 5/2010 | Hannuksela et al. |
| 7,711,647 B2 | 5/2010 | Gunaseelan et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,788,271 B2 | 8/2010 | Soma et al. |
| 7,817,608 B2 | 10/2010 | Rassool et al. |
| 7,853,980 B2 | 12/2010 | Pedlow, Jr. et al. |
| 7,864,186 B2 | 1/2011 | Robotham et al. |
| 7,869,691 B2 | 1/2011 | Kelly et al. |
| 7,873,740 B2 | 1/2011 | Sitaraman et al. |
| 7,882,034 B2 | 2/2011 | Hug et al. |
| 7,945,143 B2 | 5/2011 | Yahata et al. |
| 7,949,703 B2 | 5/2011 | Matsuzaki et al. |
| 7,962,942 B1 | 6/2011 | Craner |
| 7,974,714 B2 | 7/2011 | Hoffberg |
| 7,984,513 B1 | 7/2011 | Kyne et al. |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,082,442 B2 | 12/2011 | Keljo et al. |
| 8,131,875 B1 | 3/2012 | Chen |
| 8,169,916 B1 | 5/2012 | Pai et al. |
| 8,195,714 B2 | 6/2012 | Mckibben et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,243,924 B2 | 8/2012 | Chen et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 | 9/2012 | Ram et al. |
| 8,286,213 B2 | 10/2012 | Seo |
| 8,286,621 B2 | 10/2012 | Halmone |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu et al. |
| 8,311,115 B2 | 11/2012 | Gu et al. |
| 8,312,079 B2 | 11/2012 | Newsome et al. |
| 8,321,556 B1 | 11/2012 | Chatterjee et al. |
| 8,325,800 B2 | 12/2012 | Holcomb et al. |
| 8,327,009 B2 | 12/2012 | Prestenback et al. |
| 8,341,715 B2 | 12/2012 | Sherkin et al. |
| 8,346,753 B2 | 1/2013 | Hayes |
| 8,369,421 B2 | 2/2013 | Kadono et al. |
| 8,386,621 B2 | 2/2013 | Park |
| 8,396,114 B2 | 3/2013 | Gu et al. |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Shoham et al. |
| 8,456,380 B2 | 6/2013 | Pagan |
| 8,464,066 B1 | 6/2013 | Price et al. |
| 8,472,792 B2 | 6/2013 | Butt |
| 8,473,630 B1 | 6/2013 | Galligan et al. |
| 8,484,368 B2 | 7/2013 | Robert et al. |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,527,645 B1 | 9/2013 | Proffit et al. |
| 8,595,378 B1 | 11/2013 | Cohn |
| 8,606,069 B2 | 12/2013 | Okubo et al. |
| 8,640,166 B1 | 1/2014 | Craner et al. |
| 8,649,669 B2 | 2/2014 | Braness et al. |
| 8,656,183 B2 | 2/2014 | Russell et al. |
| 8,677,428 B2 | 3/2014 | Lewis et al. |
| 8,681,866 B1 | 3/2014 | Jia |
| 8,683,066 B2 | 3/2014 | Hurst et al. |
| 8,689,267 B2 | 4/2014 | Hunt |
| 8,726,264 B1 | 5/2014 | Allen et al. |

(56) References Cited

U.S. PATENT DOCUMENTS

| | | |
|---|---|---|
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,782,268 B2 | 7/2014 | Pyle et al. |
| 8,805,109 B2 | 8/2014 | Shoham et al. |
| 8,806,188 B2 | 8/2014 | Braness et al. |
| 8,819,116 B1 | 8/2014 | Tomay et al. |
| 8,832,434 B2 | 9/2014 | Apostolopoulos et al. |
| 8,843,586 B2 | 9/2014 | Pantos et al. |
| 8,849,950 B2 | 9/2014 | Stockhammer et al. |
| 8,856,218 B1 | 10/2014 | Inskip |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,535 B2 | 12/2014 | Ma et al. |
| 8,918,636 B2 | 12/2014 | Kiefer |
| 8,918,908 B2 | 12/2014 | Ziskind et al. |
| 8,948,249 B2 | 2/2015 | Sun et al. |
| 8,964,977 B2 | 2/2015 | Ziskind et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,038,116 B1 | 5/2015 | Knox et al. |
| 9,042,670 B2 | 5/2015 | Carmel et al. |
| 9,049,497 B2 | 6/2015 | Chen et al. |
| 9,060,207 B2 | 6/2015 | Scherkus et al. |
| 9,094,737 B2 | 7/2015 | Shivadas et al. |
| 9,098,335 B2 | 8/2015 | Muthiah et al. |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,457 B2 | 11/2015 | Van der Schaar |
| 9,197,685 B2 | 11/2015 | Soroushian |
| 9,201,922 B2 | 12/2015 | Soroushian et al. |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,479,805 B2 | 10/2016 | Rothschild et al. |
| 9,485,546 B2 | 11/2016 | Chen et al. |
| 9,571,827 B2 | 2/2017 | Su et al. |
| 9,584,557 B2 | 2/2017 | Panje et al. |
| 9,584,847 B2 | 2/2017 | Ma et al. |
| 9,621,522 B2 | 4/2017 | Kiefer et al. |
| 9,667,684 B2 | 5/2017 | Ziskind et al. |
| 9,672,286 B2 | 6/2017 | Soroushian et al. |
| 9,686,332 B1 | 6/2017 | Binns et al. |
| 9,706,259 B2 | 7/2017 | Chan et al. |
| 9,712,890 B2 | 7/2017 | Shivadas et al. |
| 9,798,863 B2 | 10/2017 | Grab et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,967,189 B2 | 5/2018 | Patel et al. |
| 9,967,305 B2 | 5/2018 | Braness |
| 10,169,094 B2 | 1/2019 | Iyer |
| 10,212,486 B2 | 2/2019 | Chan et al. |
| 10,225,299 B2 | 3/2019 | van der Schaar et al. |
| 10,225,588 B2 | 3/2019 | Kiefer et al. |
| 10,244,272 B2 | 3/2019 | Kiefer et al. |
| 10,264,255 B2 | 4/2019 | Naletov et al. |
| 10,321,168 B2 | 6/2019 | van der Schaar et al. |
| 10,341,698 B2 | 7/2019 | Kiefer et al. |
| 10,368,096 B2 | 7/2019 | Braness et al. |
| 10,382,785 B2 | 8/2019 | Braness et al. |
| 10,437,896 B2 | 10/2019 | Soroushian et al. |
| 10,462,537 B2 | 10/2019 | Shivadas et al. |
| 10,805,368 B2 | 10/2020 | van der Schaar et al. |
| 10,893,305 B2 | 1/2021 | van der Schaar et al. |
| 10,992,955 B2 | 4/2021 | Braness et al. |
| 2001/0021276 A1 | 9/2001 | Zhou |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0052077 A1 | 12/2001 | Fung et al. |
| 2001/0052127 A1 | 12/2001 | Seo et al. |
| 2001/0053222 A1 | 12/2001 | Wakao et al. |
| 2002/0026560 A1 | 2/2002 | Jordan et al. |
| 2002/0034252 A1 | 3/2002 | Owen et al. |
| 2002/0048450 A1 | 4/2002 | Zetts |
| 2002/0051494 A1 | 5/2002 | Yamaguchi et al. |
| 2002/0057898 A1 | 5/2002 | Normile |
| 2002/0062313 A1 | 5/2002 | Lee et al. |
| 2002/0067432 A1 | 6/2002 | Kondo et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0110193 A1 | 8/2002 | Yoo et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0135607 A1 | 9/2002 | Kato et al. |
| 2002/0136298 A1 | 9/2002 | Anantharamu et al. |
| 2002/0141503 A1 | 10/2002 | Kobayashi et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0154779 A1 | 10/2002 | Asano et al. |
| 2002/0159528 A1 | 10/2002 | Graziani et al. |
| 2002/0159598 A1 | 10/2002 | Rubinstein et al. |
| 2002/0161462 A1 | 10/2002 | Fay |
| 2002/0164024 A1 | 11/2002 | Arakawa et al. |
| 2002/0169971 A1 | 11/2002 | Asano et al. |
| 2002/0180929 A1 | 12/2002 | Tseng et al. |
| 2002/0184159 A1 | 12/2002 | Tadayon et al. |
| 2002/0184515 A1 | 12/2002 | Oho et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002577 A1 | 1/2003 | Pinder |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee et al. |
| 2003/0044080 A1 | 3/2003 | Frishman et al. |
| 2003/0053541 A1 | 3/2003 | Sun et al. |
| 2003/0061305 A1 | 3/2003 | Copley et al. |
| 2003/0061369 A1 | 3/2003 | Aksu et al. |
| 2003/0063675 A1 | 4/2003 | Kang et al. |
| 2003/0065777 A1 | 4/2003 | Mattila et al. |
| 2003/0077071 A1 | 4/2003 | Lin et al. |
| 2003/0078891 A1 | 4/2003 | Capitant |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0135742 A1 | 7/2003 | Evans |
| 2003/0142594 A1 | 7/2003 | Tsumagari et al. |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |

(56) References Cited

U.S. PATENT DOCUMENTS

| | | |
|---|---|---|
| 2003/0206558 A1 | 11/2003 | Parkkinen et al. |
| 2003/0206717 A1 | 11/2003 | Yogeshwar et al. |
| 2003/0210821 A1 | 11/2003 | Yogeshwar et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0001594 A1 | 1/2004 | Krishnaswamy et al. |
| 2004/0006701 A1 | 1/2004 | Kresina et al. |
| 2004/0021684 A1 | 2/2004 | Millner |
| 2004/0022391 A1 | 2/2004 | Obrien |
| 2004/0024688 A1 | 2/2004 | Bi et al. |
| 2004/0025180 A1 | 2/2004 | Begeja et al. |
| 2004/0028227 A1 | 2/2004 | Yu |
| 2004/0031058 A1 | 2/2004 | Reisman |
| 2004/0037421 A1 | 2/2004 | Truman |
| 2004/0039916 A1 | 2/2004 | Aldis et al. |
| 2004/0047592 A1 | 3/2004 | Seo et al. |
| 2004/0047607 A1 | 3/2004 | Seo et al. |
| 2004/0047614 A1 | 3/2004 | Green |
| 2004/0052501 A1 | 3/2004 | Tam |
| 2004/0071453 A1 | 4/2004 | Valderas |
| 2004/0076237 A1 | 4/2004 | Kadono et al. |
| 2004/0081333 A1 | 4/2004 | Grab et al. |
| 2004/0081434 A1 | 4/2004 | Jung et al. |
| 2004/0084035 A1 | 5/2004 | Newton |
| 2004/0093494 A1 | 5/2004 | Nishimoto et al. |
| 2004/0093618 A1 | 5/2004 | Baldwin et al. |
| 2004/0101059 A1 | 5/2004 | Joch et al. |
| 2004/0101142 A1 | 5/2004 | Nasypny |
| 2004/0105549 A1 | 6/2004 | Suzuki et al. |
| 2004/0107356 A1 | 6/2004 | Shamoon et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0217971 A1 | 11/2004 | Kim |
| 2004/0243488 A1 | 12/2004 | Yamamoto et al. |
| 2004/0255115 A1 | 12/2004 | DeMello et al. |
| 2004/0255236 A1 | 12/2004 | Collart |
| 2005/0004875 A1 | 1/2005 | Kontio et al. |
| 2005/0005025 A1 | 1/2005 | Harville et al. |
| 2005/0013494 A1 | 1/2005 | Srinivasan et al. |
| 2005/0015509 A1 | 1/2005 | Sitaraman et al. |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0063541 A1 | 3/2005 | Candelore |
| 2005/0071280 A1 | 3/2005 | Irwin et al. |
| 2005/0076232 A1 | 4/2005 | Kawaguchi |
| 2005/0108320 A1 | 5/2005 | Lord et al. |
| 2005/0114534 A1 | 5/2005 | Lee |
| 2005/0114896 A1 | 5/2005 | Hug |
| 2005/0132208 A1 | 6/2005 | Hug et al. |
| 2005/0144468 A1 | 6/2005 | Northcutt |
| 2005/0149450 A1 | 7/2005 | Stefik et al. |
| 2005/0177741 A1 | 8/2005 | Chen et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | van Zoest et al. |
| 2005/0207578 A1 | 9/2005 | Matsuyama et al. |
| 2005/0243912 A1 | 11/2005 | Kwon et al. |
| 2005/0254508 A1 | 11/2005 | Aksu et al. |
| 2005/0265555 A1 | 12/2005 | Pippuri |
| 2005/0273695 A1 | 12/2005 | Schnurr |
| 2005/0275656 A1 | 12/2005 | Corbin et al. |
| 2006/0013568 A1 | 1/2006 | Rodriguez |
| 2006/0015580 A1 | 1/2006 | Gabriel et al. |
| 2006/0020825 A1 | 1/2006 | Grab |
| 2006/0026294 A1 | 2/2006 | Virdi et al. |
| 2006/0026302 A1 | 2/2006 | Bennett et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0059223 A1 | 3/2006 | Klemets et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki et al. |
| 2006/0129909 A1 | 6/2006 | Butt et al. |
| 2006/0165163 A1 | 7/2006 | Burazerovic et al. |
| 2006/0165233 A1 | 7/2006 | Nonaka et al. |
| 2006/0168639 A1 | 7/2006 | Gan et al. |
| 2006/0173887 A1 | 8/2006 | Breitfeld et al. |
| 2006/0179239 A1 | 8/2006 | Fluhr et al. |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae et al. |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047645 A1 | 3/2007 | Takashima |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0067472 A1 | 3/2007 | Maertens et al. |
| 2007/0067622 A1 | 3/2007 | Nakano et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0101271 A1 | 5/2007 | Hua et al. |
| 2007/0101387 A1 | 5/2007 | Hua et al. |
| 2007/0133603 A1 | 6/2007 | Weaver et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0156770 A1 | 7/2007 | Espelien |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180051 A1 | 8/2007 | Kelly et al. |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0256141 A1 | 11/2007 | Nakano et al. |
| 2007/0271317 A1 | 11/2007 | Carmel et al. |
| 2007/0271385 A1 | 11/2007 | Davis et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan et al. |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008319 A1 | 1/2008 | Poirier |
| 2008/0008455 A1 | 1/2008 | De Lange et al. |

(56) References Cited

U.S. PATENT DOCUMENTS

| | | |
|---|---|---|
| 2008/0043832 A1 | 2/2008 | Barkley et al. |
| 2008/0046718 A1 | 2/2008 | Grab et al. |
| 2008/0046925 A1 | 2/2008 | Lee et al. |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086570 A1 | 4/2008 | Dey et al. |
| 2008/0086747 A1 | 4/2008 | Rasanen et al. |
| 2008/0101466 A1 | 5/2008 | Swenson et al. |
| 2008/0101718 A1 | 5/2008 | Yang et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0120637 A1 | 5/2008 | Deiss |
| 2008/0126248 A1 | 5/2008 | Lee et al. |
| 2008/0131078 A1 | 6/2008 | Jeong et al. |
| 2008/0134043 A1 | 6/2008 | Georgis |
| 2008/0137541 A1 | 6/2008 | Agarwal et al. |
| 2008/0137736 A1 | 6/2008 | Richardson et al. |
| 2008/0137847 A1 | 6/2008 | Candelore et al. |
| 2008/0151817 A1 | 6/2008 | Fitchett et al. |
| 2008/0162949 A1 | 7/2008 | Sato et al. |
| 2008/0172441 A1 | 7/2008 | Speicher et al. |
| 2008/0184119 A1 | 7/2008 | Eyal et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0201705 A1 | 8/2008 | Wookey |
| 2008/0205860 A1 | 8/2008 | Holtman |
| 2008/0209534 A1 | 8/2008 | Keronen et al. |
| 2008/0219449 A1 | 9/2008 | Ball et al. |
| 2008/0229025 A1 | 9/2008 | Plamondon |
| 2008/0240144 A1 | 10/2008 | Kruse et al. |
| 2008/0256105 A1 | 10/2008 | Nogawa et al. |
| 2008/0263354 A1 | 10/2008 | Beuque et al. |
| 2008/0271102 A1 | 10/2008 | Kienzle et al. |
| 2008/0279535 A1 | 11/2008 | Haque et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang et al. |
| 2008/0313541 A1 | 12/2008 | Shafton et al. |
| 2008/0320160 A1 | 12/2008 | Sitaraman et al. |
| 2009/0010622 A1 | 1/2009 | Yahata et al. |
| 2009/0013195 A1 | 1/2009 | Ochi et al. |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0077143 A1 | 3/2009 | Macy, Jr. |
| 2009/0097644 A1 | 4/2009 | Haruki |
| 2009/0106082 A1 | 4/2009 | Senti et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0138570 A1 | 5/2009 | Miura et al. |
| 2009/0150406 A1 | 6/2009 | Giblin |
| 2009/0150557 A1 | 6/2009 | Wormley et al. |
| 2009/0165148 A1 | 6/2009 | Frey et al. |
| 2009/0168795 A1 | 7/2009 | Segel |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0249081 A1 | 10/2009 | Zayas |
| 2009/0265737 A1 | 10/2009 | Issa et al. |
| 2009/0268905 A1 | 10/2009 | Matsushima et al. |
| 2009/0276636 A1 | 11/2009 | Grab et al. |
| 2009/0282162 A1 | 11/2009 | Mehrotra et al. |
| 2009/0290706 A1 | 11/2009 | Amini et al. |
| 2009/0290708 A1 | 11/2009 | Schneider et al. |
| 2009/0293116 A1 | 11/2009 | DeMello et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0005393 A1 | 1/2010 | Tokashiki et al. |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142915 A1 | 6/2010 | Mcdermott et al. |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0235528 A1 | 9/2010 | Bocharov et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0316126 A1 | 12/2010 | Chen et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0010466 A1 | 1/2011 | Fan et al. |
| 2011/0016225 A1 | 1/2011 | Park et al. |
| 2011/0047209 A1 | 2/2011 | Lindholm et al. |
| 2011/0055585 A1 | 3/2011 | Lee |
| 2011/0058675 A1 | 3/2011 | Brueck et al. |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082914 A1 | 4/2011 | Robert et al. |
| 2011/0082924 A1 | 4/2011 | Gopalakrishnan |
| 2011/0096828 A1 | 4/2011 | Chen et al. |
| 2011/0103374 A1 | 5/2011 | Lajoie et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0145858 A1 | 6/2011 | Philpott et al. |
| 2011/0149753 A1 | 6/2011 | Bapst et al. |
| 2011/0150100 A1 | 6/2011 | Abadir |
| 2011/0153785 A1 | 6/2011 | Minborg et al. |

(56) References Cited

U.S. PATENT DOCUMENTS

| | | |
|---|---|---|
| 2011/0153835 A1 | 6/2011 | Rimac et al. |
| 2011/0173345 A1 | 7/2011 | Knox et al. |
| 2011/0179185 A1 | 7/2011 | Wang et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197261 A1 | 8/2011 | Dong et al. |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0246661 A1 | 10/2011 | Manzari et al. |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276555 A1 | 11/2011 | Fiero |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0314130 A1 | 12/2011 | Strasman |
| 2011/0314176 A1 | 12/2011 | Frojdh et al. |
| 2011/0314500 A1 | 12/2011 | Gordon |
| 2012/0005312 A1 | 1/2012 | Mcgowan et al. |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0042090 A1 | 2/2012 | Chen et al. |
| 2012/0047542 A1 | 2/2012 | Lewis et al. |
| 2012/0066360 A1 | 3/2012 | Ghosh |
| 2012/0093214 A1 | 4/2012 | Urbach |
| 2012/0110120 A1 | 5/2012 | Willig et al. |
| 2012/0114302 A1 | 5/2012 | Randall |
| 2012/0124191 A1 | 5/2012 | Lyon |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0147958 A1 | 6/2012 | Ronca et al. |
| 2012/0166633 A1 | 6/2012 | Baumback et al. |
| 2012/0167132 A1 | 6/2012 | Mathews et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0188069 A1 | 7/2012 | Colombo et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0257678 A1 | 10/2012 | Zhou et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0311174 A1 | 12/2012 | Bichot et al. |
| 2012/0314778 A1 | 12/2012 | Salustri et al. |
| 2012/0317235 A1 | 12/2012 | Nguyen et al. |
| 2012/0331167 A1 | 12/2012 | Hunt |
| 2013/0007223 A1 | 1/2013 | Luby et al. |
| 2013/0013730 A1 | 1/2013 | Li et al. |
| 2013/0013803 A1 | 1/2013 | Bichot et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0080267 A1 | 3/2013 | McGowan |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0159633 A1 | 6/2013 | Lilly |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170561 A1* | 7/2013 | Hannuksela ......... H04N 19/159<br>375/240.25 |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179589 A1 | 7/2013 | Mccarthy et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1 | 8/2013 | Luby et al. |
| 2013/0227111 A1 | 8/2013 | Wright et al. |
| 2013/0227122 A1 | 8/2013 | Gao |
| 2013/0297602 A1 | 11/2013 | Soroushian et al. |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019592 A1 | 1/2014 | Arana et al. |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman, II et al. |
| 2014/0096171 A1 | 4/2014 | Shivadas et al. |
| 2014/0096269 A1 | 4/2014 | Amidei et al. |
| 2014/0101722 A1 | 4/2014 | Moore |
| 2014/0114951 A1 | 4/2014 | Sasaki et al. |
| 2014/0115650 A1 | 4/2014 | Zhang et al. |
| 2014/0119432 A1 | 5/2014 | Wang et al. |
| 2014/0140253 A1 | 5/2014 | Lohmar et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0149557 A1 | 5/2014 | Lohmar et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0247869 A1* | 9/2014 | Su ..................... H04N 19/124<br>375/240.03 |
| 2014/0250473 A1 | 9/2014 | Braness et al. |

(56) References Cited

U.S. PATENT DOCUMENTS

| | | |
|---|---|---|
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0026677 A1 | 1/2015 | Stevens et al. |
| 2015/0043554 A1 | 2/2015 | Meylan et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0281310 A1 | 10/2015 | Ziskind et al. |
| 2015/0288530 A1 | 10/2015 | Oyman |
| 2015/0288996 A1 | 10/2015 | Van Der Schaar et al. |
| 2015/0334435 A1 | 11/2015 | Shivadas et al. |
| 2015/0373421 A1 | 12/2015 | Chan et al. |
| 2016/0048593 A1 | 2/2016 | Soroushian et al. |
| 2016/0070890 A1 | 3/2016 | Grab et al. |
| 2016/0112382 A1 | 4/2016 | Kiefer et al. |
| 2016/0149981 A1 | 5/2016 | Shivadas et al. |
| 2016/0219303 A1 | 7/2016 | Braness et al. |
| 2017/0083474 A1 | 3/2017 | Meswani et al. |
| 2017/0214947 A1 | 7/2017 | Kiefer et al. |
| 2017/0223389 A1 | 8/2017 | Soroushian et al. |
| 2017/0238030 A1 | 8/2017 | Ziskind et al. |
| 2017/0280203 A1 | 9/2017 | Chan et al. |
| 2018/0007451 A1 | 1/2018 | Shivadas et al. |
| 2018/0060543 A1 | 3/2018 | Grab et al. |
| 2018/0081548 A1 | 3/2018 | Barzik et al. |
| 2018/0131980 A1 | 5/2018 | Van Der Schaar et al. |
| 2018/0220153 A1 | 8/2018 | Braness et al. |
| 2018/0262757 A1 | 9/2018 | Naletov et al. |
| 2018/0285261 A1 | 10/2018 | Mandal et al. |
| 2018/0332094 A1 | 11/2018 | Braness |
| 2019/0020907 A1 | 1/2019 | Kiefer et al. |
| 2019/0020928 A1 | 1/2019 | Chan et al. |
| 2019/0045219 A1 | 2/2019 | Braness et al. |
| 2019/0045220 A1 | 2/2019 | Braness et al. |
| 2019/0045234 A1 | 2/2019 | Kiefer et al. |
| 2019/0158553 A1 | 5/2019 | Van Der Schaar et al. |
| 2019/0268596 A1 | 8/2019 | Naletov et al. |
| 2019/0297364 A1 | 9/2019 | van der Schaar et al. |
| 2019/0342587 A1 | 11/2019 | Kiefer et al. |
| 2019/0356928 A1 | 11/2019 | Braness et al. |
| 2020/0059706 A1 | 2/2020 | Shivadas et al. |
| 2021/0250608 A1 | 8/2021 | Braness et al. |

FOREIGN PATENT DOCUMENTS

| | | |
|---|---|---|
| CA | 2749170 A1 | 7/2010 |
| CA | 2749170 C | 6/2016 |
| CA | 2823829 C | 1/2019 |
| CN | 1169229 A | 12/1997 |
| CN | 1221284 A | 6/1999 |
| CN | 1235473 A | 11/1999 |
| CN | 1629939 A | 6/2005 |
| CN | 1723696 A | 1/2006 |
| CN | 101252401 A | 8/2008 |
| CN | 102549557 A | 7/2012 |
| CN | 102549557 B | 9/2015 |
| CN | 105072454 A | 11/2015 |
| CN | 105072454 B | 4/2019 |
| EP | 0757484 A2 | 2/1997 |
| EP | 0813167 A2 | 12/1997 |
| EP | 0818111 A1 | 1/1998 |
| EP | 0936812 A1 | 8/1999 |
| EP | 0818111 B1 | 1/2000 |
| EP | 1056273 A2 | 11/2000 |
| EP | 1187483 A2 | 3/2002 |
| EP | 1420580 A1 | 5/2004 |
| EP | 1453319 A1 | 9/2004 |
| EP | 1553779 A1 | 7/2005 |
| EP | 1657835 A1 | 5/2006 |
| EP | 1283640 B1 | 10/2006 |
| EP | 1718074 A1 | 11/2006 |
| EP | 2180664 A1 | 4/2010 |
| EP | 2360923 A1 | 8/2011 |
| EP | 2384475 A1 | 11/2011 |
| EP | 2486517 A1 | 8/2012 |
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 | 7/2013 |
| EP | 2661696 A1 | 11/2013 |
| EP | 2661875 A1 | 11/2013 |
| EP | 2661895 A2 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 | 12/2014 |
| EP | 2751990 A4 | 4/2015 |
| EP | 2661875 B1 | 11/2019 |
| EP | 2661696 B1 | 5/2020 |
| EP | 3697096 A1 | 8/2020 |
| EP | 3700219 A1 | 8/2020 |
| EP | 3742740 A1 | 11/2020 |
| EP | 3975574 A1 | 3/2022 |
| EP | 3742740 B1 | 5/2022 |
| HK | 1125765 A | 8/2009 |
| JP | 08046902 A | 2/1996 |
| JP | 08111842 A | 4/1996 |
| JP | 08163488 A | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 2001043668 A | 2/2001 |
| JP | 2001209726 A | 8/2001 |
| JP | 2001346165 A | 12/2001 |
| JP | 2002164880 A | 6/2002 |
| JP | 2002170363 A | 6/2002 |
| JP | 2002518898 A | 6/2002 |
| JP | 2002218384 A | 8/2002 |
| JP | 2003179597 A | 6/2003 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2004304767 A | 10/2004 |
| JP | 2004328218 A | 11/2004 |
| JP | 2005027153 A | 1/2005 |
| JP | 2005504480 A | 2/2005 |
| JP | 2005080204 A | 3/2005 |
| JP | 2005286881 A | 10/2005 |
| JP | 2006155500 A | 6/2006 |
| JP | 2006521035 A | 9/2006 |
| JP | 2006524007 A | 10/2006 |
| JP | 2007036666 A | 2/2007 |
| JP | 2007174375 A | 7/2007 |

(56) References Cited

FOREIGN PATENT DOCUMENTS

| | | |
|---|---|---|
| JP | 2007235690 A | 9/2007 |
| JP | 2007535881 A | 12/2007 |
| JP | 2008235999 A1 | 10/2008 |
| JP | 2009522887 A | 6/2009 |
| JP | 2009530917 A | 8/2009 |
| JP | 2012514951 A | 6/2012 |
| JP | 2013513298 A | 4/2013 |
| JP | 5200204 B2 | 6/2013 |
| JP | 2014506430 A | 3/2014 |
| JP | 5681641 B2 | 1/2015 |
| JP | 5723888 B2 | 5/2015 |
| JP | 2015167357 A | 9/2015 |
| JP | 6038805 B2 | 12/2016 |
| JP | 6078574 B2 | 2/2017 |
| JP | 2017063453 A | 3/2017 |
| JP | 2018160923 A | 10/2018 |
| JP | 6453291 B2 | 1/2019 |
| JP | 6657313 B2 | 2/2020 |
| JP | 2020080551 A | 5/2020 |
| JP | 2021158694 A | 10/2021 |
| JP | 7000475 B2 | 12/2021 |
| KR | 100221423 B1 | 9/1999 |
| KR | 2002013664 A | 2/2002 |
| KR | 20020064888 A | 8/2002 |
| KR | 20040039852 A | 5/2004 |
| KR | 20060106250 A | 10/2006 |
| KR | 100669616 B1 | 1/2007 |
| KR | 20070005699 A | 1/2007 |
| KR | 20100106418 A | 10/2010 |
| KR | 20110133024 A | 12/2011 |
| KR | 20130133830 A | 12/2013 |
| KR | 101635876 B1 | 7/2016 |
| KR | 101874907 B1 | 7/2018 |
| KR | 101917763 B1 | 11/2018 |
| KR | 101988877 B1 | 6/2019 |
| KR | 102072839 B1 | 1/2020 |
| KR | 102122189 B1 | 6/2020 |
| KR | 102191317 B1 | 12/2020 |
| KR | 102195414 B1 | 12/2020 |
| KR | 102274290 B1 | 7/2021 |
| KR | 10-2352043 B1 | 1/2022 |
| KR | 102408120 B1 | 6/2022 |
| MX | 2011007344 A | 2/2012 |
| MX | 316584 B | 12/2013 |
| RU | 2328040 C2 | 6/2008 |
| SG | 146026 | 12/2010 |
| WO | 1995015660 A1 | 6/1995 |
| WO | 1996013121 A1 | 5/1996 |
| WO | 1997031445 A3 | 4/1998 |
| WO | 1999010836 A1 | 3/1999 |
| WO | 1999065239 A2 | 12/1999 |
| WO | 2000049762 A2 | 8/2000 |
| WO | 2000049763 A1 | 8/2000 |
| WO | 2001004892 A1 | 1/2001 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A2 | 1/2002 |
| WO | 2002035832 A2 | 5/2002 |
| WO | 2002037210 A2 | 5/2002 |
| WO | 2002054196 A2 | 7/2002 |
| WO | 2003030000 A1 | 4/2003 |
| WO | 2003047262 A2 | 6/2003 |
| WO | 2003096136 A2 | 11/2003 |
| WO | 2004012378 A2 | 2/2004 |
| WO | 2004054247 A1 | 6/2004 |
| WO | 2004097811 A1 | 11/2004 |
| WO | 2004100158 A1 | 11/2004 |
| WO | 2004102571 A1 | 11/2004 |
| WO | 2005008385 A2 | 1/2005 |
| WO | 2005015935 A1 | 2/2005 |
| WO | 2005050373 A2 | 6/2005 |
| WO | 2005109224 A2 | 11/2005 |
| WO | 2006012398 A2 | 2/2006 |
| WO | 2006018843 A2 | 2/2006 |
| WO | 2006018843 A3 | 12/2006 |
| WO | 2007044590 A2 | 4/2007 |
| WO | 2007073347 A1 | 6/2007 |
| WO | 2007113836 A2 | 10/2007 |
| WO | 2008010275 A1 | 1/2008 |
| WO | 2008042242 A2 | 4/2008 |
| WO | 2008086313 A1 | 7/2008 |
| WO | 2008090859 A1 | 7/2008 |
| WO | 2007113836 A3 | 11/2008 |
| WO | 2008135932 A2 | 11/2008 |
| WO | 2007113836 B1 | 12/2008 |
| WO | 2009006302 A1 | 1/2009 |
| WO | 2009065137 A1 | 5/2009 |
| WO | 2009070770 A1 | 6/2009 |
| WO | 2009109976 A2 | 9/2009 |
| WO | 2010005673 A2 | 1/2010 |
| WO | 2010060106 A1 | 5/2010 |
| WO | 2010080911 A1 | 7/2010 |
| WO | 2010089962 A1 | 8/2010 |
| WO | 2010108053 A1 | 9/2010 |
| WO | 2010111261 A1 | 9/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011086190 A1 | 7/2011 |
| WO | 2011087449 A1 | 7/2011 |
| WO | 2011101371 A1 | 8/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 2012094181 A2 | 7/2012 |
| WO | 2012094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013111126 A3 | 8/2013 |
| WO | 2013032518 A3 | 9/2013 |
| WO | 2013144942 A1 | 10/2013 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |

OTHER PUBLICATIONS

Information Technology—MPEG Systems Technologies—Part 7: Common Encryption in ISO Base Media File Format Files (ISO/IEC 23001-7), Apr. 2015, 24 pgs.
ISO/IEC 14496-12 Information technology—Coding of audio-visual-objects—Part 12: ISO base media file format, Feb. 2004 ("MPEG—4 Part 12 Standard"), 62 pgs.
ISO/IEC 14496-12:2008(E) Informational Technology—Coding of Audio Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.

(56) References Cited

OTHER PUBLICATIONS

Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 2000, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Enryption Standard", International Journal of computer Theory and Engineering, Apr. 2010, vol. 2, No. 2, pp. 223-229.
Alattar et al., "Improved selective encryption techniques for secure transmission of MPEG video bit-streams", In Proceedings 1999 International Conference on Image Processing (Cat. 99CH36348), vol. 4 IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System Disk Scheduling, Network", Proceedings of Globecom '95, Nov. 14-16, 1995, 6 pgs.
Beker et al., "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 16, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Mulimedia and Expo, Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kang et al., "Access Emulation and Buffering Techniques for Streaming of Non-Stream Format Video Files", IEEE Transactions on Consumer Electronics, vol. 43, No. 3, Aug. 2001, 7 pgs.
Kim et al., "A Deblocking Filter and Two Seperate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Lagault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies, Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video. Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Arifacts in Image and Video Coding", IEEE Transactions on Circuits and Systems for Video Technology, vol. 9, No. 3, Apr. 1999, pp. 490-500.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Arifacts", IEEE Transactions on Circuits and Systems for Video Technology, vol. 5, No. 6, Dec. 1995, pp. 490-499.

(56) References Cited

OTHER PUBLICATIONS

Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Sakhor, "Iterative Procedures for Reduction of Blocking Effects in Transform Image Coding", IEEE Transactions on Circuits and Systems for Video Technology, vol. 2, No. 1, Mar. 1992, pp. 91-95.
EP11774529 Supplementary European Search Report, completed Jan. 31, 2014, 2 pgs.
Final draft ETSI ES 202 109, V1.1.1, ETSI Standard, Terrestrial Trunked Radio (TETRA); Security; Synchronization mechanism for end-to-end encryption, Oct. 2002, 17 pgs.
International Preliminary Report on Patentability for International Application No. PCT/US2007/063950, Report Completed Dec. 18, 2009, 3 pgs.
International Preliminary Report on Patentability for International Application No. PCT/US2010/56733, dated Jun. 5, 2012, 5 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
Open DML AVI-M-JPEG File Format Subcommittee, "Open DML AVI File Format Extensions", Version 1.02, Feb. 28, 1996, 29 pgs.
Supplementary European Search Report for European Application No. 07758499.3, Report Completed Jan. 25, 2013, 8 pgs.
Written Opinion for International Application No. PCT/US2007/063850 filed Mar. 14, 2007, report completed Mar. 1, 2008; report dated Mar. 19, 2008, 6 pgs.
3GPP TS 26.247, V1.3.0, 3rd Generation Partnership Project; Technical Specification Group Services and System Aspects Transparent end-to-end Packet-switches Streaming Services (PSS); Progressive Download and Dynamic Adaptive Streaming over HTTP (3GP-DASHH) (Release 10), Mar. 2011, 72 pgs.
"Draft CR: Trick Mode for HTTP Streaming", 3GPP TSG-SA4 Meeting #58, Apr. 26-30, 2010, Vancouver, Canada, S4-100237, 3 pgs.
"Information Technology—Coding of audio-visual objects—Part 17: Streaming text", International Organisation for Standardisation, Feb. 2004, 22 pgs.
"Information-Technology—Generic coding of moving pictures and associated audio: Systems, Recommendation H.222.0", International Standard, ISO/IEC 13818-1, Draft 1209, Apr. 25, 1995, 151 pages.
"MPEG-4 File Format, Version 2", Sustainability of Digial Formats: Planning for Library of Congress Collections, Retrieved from: https://www.loc.gov/preservation/digial/formats/fdd/fdd000155.shtml, Last updated Feb. 21, 2017, 8 pgs.
Adams et al., "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al., "Optimized Adaptive HTTP Streaming for Mobile Devices", International Society for Optics and Photonics, Applications of Digital Image Processing XXXIV, vol. 8135, Sep. 2011, p. 81350T-1-81350T-10.
Bloom et al., "Copy Protection for DVD Video", Proceedings of the IEEE, vol. 87, Nov. 7, Jul. 1999, pp. 1267-1276.
Concolato et al., "Live HTTP Streaming of Video and Subtitles within a Browser", MMSys 2013, Feb. 26-Mar. 1, 2013, Oslo, Norway, 5 pgs.
De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.
Eskicioglu et al., "An Integrated Approach to Encrypting Scalable Video", Proceedings IEEE International Conference on Multimedia and Expo, Aug. 26-29, 2002, Lausanne, Switzerland, 4 pgs.
Fecheyr-Lippens, "Review of HTTP Live Streaming", Internet Citation, Jan. 25, 2010, pp. 1-37.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Hurtado Guzman, Juan Esteban "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.
Li et al., "Content-Aware Playout and Packet Scheduling for Video Streaming Over Wireless Links", IEEE Transactions on Multimedia, vol. 10, No. 5, Aug. 2008, pp. 885-895.
Lian et al., "Efficient video encryption scheme based on advanced video coding", Mutimed. Tools Appl. vol. 38, 2008, pp. 75-89.
Lin et al., "Mutipass Encoding for Reducing Pulsing Artifacts in Cloud Based Video Transcoding", IEEE International Conference on Image Processing (ICIP), Date of Conference Sep. 27, 30, 2015, Quebec City, QC, Canada, pp. 907-911.
Liu et al., "A Formal Framework for Component Deplyment", OOPSLA 2006, Proceedings of the 12st Annual ACM SIGPLAN Conference on Object-Oriented Programming Systems, Language, and Application, Portland, Oregon, Oct. 22-26, 2006, pp. 325-344.

(56) References Cited

OTHER PUBLICATIONS

Miras, "On Quality Aware Adaptation of Internet Video", University of London, PhD dissertation, May 2004, 191 pgs.
Moscoso, Pedro Gomes "Interactive Internet TV Architecture Based on Scalable Video Coding", Instituto Superior Techico, Universidad Technica de Lisboa, May 2011, 103 pgs.
Oyman et al, "Quality of Experience of HTTP Adaptive Streaming Services", IEEE Communications Magazine, Apr. 2012, vol. 50, No. 4, pp. 20-27, DOI: 10.1109/MCOM.2012.6178830.
Ozer, Jan "Adaptive Streaming in the Field", Streaming Media, Dec. 2010-Jan. 2011, pp. 36-47.
Padiadpu, Rashmi "Towards Mobile Learning: A SCORM Player for the Google Android Platform", Master Thesis, Hamburg Univeristy of Applied Sciences, 2008, 66 pgs.
Peed, David "Consumer Distributed File Systems", Dissertation, Doctor of Philosophy, Computer Science and Engineering, The University of Michigan, 2009, 118 pgs.
Rosenberg et al., "Indicating User Agent Capabilities in the Session Initiation Protocol (SIP)", Network Working Group, RFC 3840, Aug. 2004, 36 pgs.
Tripathi et al, "Improving Multimedia Streaming with Content-Aware Video Scaling", Retrieved from: http://digialcommons.wpi.edu/computerscience-pubs/96, 2001, 17 pgs.
Unknown, "MPEG-4 Video Encoder: Based on International Standard ISO/IEC 14496-2", Patni Computer Systems, Ltd., publication date unknown, 15 pgs.
Venkatramani et al., "Securing Media for Adaptive Streaming", Mutimedia 2003 Proceedings of the Eleventh ACM International Conference on Multimedia, Nov. 2-8, 2003, Berkeley, California, 4 pgs.
"Information-Technology—Generic coding of moving pictures and associated audio: Systems, Recommendation H.222.0", Internation Standard, ISO/IEC 133818-1, Draft 1540, Nov. 13, 1994, 161 pages.
Kiss Players, "KISS DP-500", retrieved from http://www.kiss-technology.com/?p=dp500 on May 4, 2007, 1 pg.
"Matroska", Wikipedia, Jul. 10, 2017, retrieved from https://en.wikipedia.org/wiki/Matroska on Jul. 20, 2017, 3 pages.
"Matroska Streaming | Matroska", Dec. 17, 2010, Retrieved from the Internet: URL:http://web.archive.org/web/20101217114310/http://matroska.org/technicallstreaming/index.html [retrieved on Jan. 29, 2016], 2 pages.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pages.
"MPEG-4 Part 14", Wikipedia, Jul. 10, 2017, retrieved from https://en.wikipedia.org/wiki/MPEG-4 Part 14 on Jul. 20, 2017, 5 pages.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sepr. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 42 pages.
"QCast Tuner for PS2", printed May 11, 2009 from http://webarchive.org/web/20030210120605/www.divx.com/software/detail.php?ie=39, 2 pgs.
"Series H: Audiovisual and Multimedia Systems Infrastructure of audiovisual services—Coding of moving video; High efficiency video coding", International Telecommunication Union, ITU-T H.265, Apr. 2015, 634 pages (presented in six parts).
"Smooth Streaming Client", The Official Microsoft IIS Site, Sep. 24, 2010, 4 pages.
"Specifications | Matroska", Retrieved from the Internet: URL:http://web.archive.org/web/20100706041303/http://www.matroska.org/technical/specs/index.html [retrieved on Jan. 29, 2016, Jul. 6, 2010, 14 pages.

"Specification Matroska", Dec. 17, 2010, [retrieved on Mar. 2, 2018], 12 pages.
Supplementary European Search Report for Application No. EP 10834935, International Filing Date Nov. 15, 2010, Search Completed May 27, 2014, 9 pgs.
"Supported Media Formats", Supported Media Formats, Android Developers Printed on Nov. 27, 2013 from developer.android.com/guide/appendix/media-formats.html, 3 pgs.
"Text of ISO/IEC 14496-18/COR1, Font compression and streaming", ITU Study Group 16—Videocoding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Oct. 7, 2010, Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
U.S. Appl. No. 13/905,804, "Non-Final Office Action Received", Jul. 25, 2014, 15 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPC000008165D, May 22, 2002, pp. 1-9.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standart ISO/IEC 14496-2", Patni Computer Systems, Ltd., printed Jan. 24, 2007, USA, pp. 1-15.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc., 1999, 6 pages.
Author Unknown, "Turbo-Charge Your Internet and PC Performance", printed Oct. 30, 2008 from Sepedtest.net—The Global Broadband Speed Test, 1 pg.
Author Unknown, "White paper, The New Mainstream Wireless LAN Standard", Broadcom Corporation, Jul. 2003, 12 pgs.
Blasiak, "Video Transrating and Transcoding: Overview of Video Transrating and Transcoding Technologies", Ingenient Technologies, TI Developer Conference, Aug. 6-8, 2002, 22 pgs.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013 (presented in three parts).

(56) References Cited

OTHER PUBLICATIONS

Casares et al., "Simplifying Video Editing Using Metadata", DIS2002, 2002, pp. 157-166.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Gannes, "The Lowdown on Apple's HTTP Adaptive Bitrate Streaming", GigaOM, Jun. 10, 2009, 12 pgs.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
"Information Technology-Coding of Audio Visual Objects—Part 2: Visual" International Standard, ISO/IEC 14496-2, Third Edition, Jun. 1, 2004, pp. 1-724, (presented in three parts).
Broadq—The Ultimate Home Entertainment Software, printed May 11, 2009 from ittp://web.srchive.org/web/20030401122010/www.broadq.com/qcasttuner/, 1 pg.
Cloakware Corporation, "Protecting Digital Content Using Cloakware Code Transformation Technology", Version 1.2, May 2002, pp. 1-10.
European Search Report Application No. EP 08870152, Search Completed May 19, 2011, dated May 26, 2011, 9 pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, dated Oct. 5, 2016, 9 Pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
InformationWeek, "Internet on Wheels", InformatonWeek: Front End: Daily Dose, Jul. 20, 1999, Printed on Mar. 26, 2014, 3 pgs.
International Preliminary Report for Application No. PCT/US2011/066927, Report dated Jul. 10, 2013, 13 pgs.
International Preliminary Report for International Application No. PCT/US2011/067243, dated Jul. 10, 2013, 7 pgs.
International Preliminary Report on Patentability for International Application PCT/US2014/030747, Report dated Sep. 15, 2015, dated Sep. 24, 2015, 6 Pgs.
International Preliminary Report on Patentability for International Application PCT/US2008/083816, dated May 18, 2010, 6 pgs.
International Preliminary Report on Patentability for International Application PCT/US2011/068276, dated Mar. 4, 2014, 23 pgs.
International Preliminary Report on Patentability for International Application PCT/US2011/067167, dated Feb. 25, 2014, 8 pgs.
International Preliminary Report on Patentability for International Application PCT/US2013/043181, dated Dec. 31, 2014, dated Jan. 8, 2015, 11 Pgs.
Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 21? A Look at 802.11a, b and g Throughput", Aug. 8, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
I-O Data, "Innovation of technology arrived", from http://www.iodata.com/catalogs/AVLP2DVDLA_Flyer200505.pdf, 2 pgs.
Kaspar et al., "Using HTTP Pipelining to Improve Progressive Download over Multiple Heterogeneous Interfaces", IEEE ICC proceedings, 2010, 5 pgs.
Kim, Kyuheon "MPEG-2 ES/PES/TS/PSI", Kyung-Hee University, Oct. 4, 2010, 66 pages.
Kozintsev et al., "Improving last-hop mulitcast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Long et al., "Silver: Simplifying Video Editing with Metadata", Demonstrations, CHI 2003: New Horizons, Apr. 5-10, pp. 628-629.
Matroska, "Diagram", Matroska, Technical/Info, Diagram, 2016, retrieved from https://www.matroska.org/technical/diagram/index.html on Jul. 20, 2017, 9 pages.
Matroska, "Specifications", Matroska, Technical/Info, Specifications, Jun. 25, 2017, retrieved from https://www.matroska.org/technical/specs/index.html on Jul. 20, 2017, 20 pages.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noboru, "Play Fast and Fine Video on Web! codec", Co. 9, No. 12, Dec. 1, 2003, pp. 178-179.
Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, pp. 1-51.
Noe, Alexander "AVI File Format", http://alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pages.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html, 7 pages.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

(56) References Cited

OTHER PUBLICATIONS

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H "Real Time Streaming Protocol 2.0 (RTSP): draft-ietfmmusic-rfc2326bis-27", MMUSIC Working Group of the Internet Engineering Task Force (IETF), 296 pgs. (presented in two parts), Mar. 9, 2011, 296 pages.
Siglin, "HTTP Streaming: What You Need to Know", steamingmedia.com, 2010, 15 pages.
Siglin, "Unifying Global Video Strategies, MP4 File Fragmentation for Broadcast Mobile and Web Delivery", Nov. 16, 2011, 16 pgs.
Silvio, "adaptive HTTP streaming for open codecs", Oct. 9, 2010, retrieved on: Mar. 2, 2018, 15 pages.
Tan, Yap-Peng et al., "Video transcoding for fast forward/reverse video playback", IEEE ICIP, 2002, pp. I-713 to I-716.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . Mar. 6, 2006, 7 pgs.
Unknown, "Entropy and Source Coding (Compression)", TCOM 570, 1999-9, pp. 1-22.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, "IIS Smooth Streaming Technical Overview", Microsoft Corporation, Mar. 2009, 17 pages.
International Preliminary Report on Patentability for International Application PCT/US2014/039852, dated Dec. 1, 2015, dated Dec. 5, 2015, 8 Pgs.
International Search Report and Written Opinion for International Application No. PCT/US2007/063950, completed Feb. 19, 2008; dated Mar. 19, 2008, 9 pgs.
International Search Report and Written Opinion for International Application No. PCT/US2008/087999, completed Feb. 7, 2009, dated Mar. 19, 2009, 6 pgs.
International Search Report and Written Opinion for International Application No. PCT/US2009/046588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2005/025845, completed Feb. 5, 2007 and dated May 10, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 8 pgs.
International Search Report and Written Opinion for International Application No. PCT/US2010/056733, Completed Jan. 3, 2011, dated Jan. 14, 2011, 9 pgs.
International Search Report and Written Opinion for International Application No. PCT/US2011/067243, Search Completed Apr. 24, 2012, dated May 8, 2012, 8 pgs.
International Search Report and Written Opinion for International Application No. PCT/US2013/043181, completed Nov. 27, 2013, dated Dec. 6, 2013, 12 pgs.
International Search Report and Written Opinion for International Application No. PCT/US2014/030747, completed Jul. 30, 2014, dated Aug. 22, 2014, 7 pgs.
International Search Report and Written Opinion for International Application No. PCT/US2014/039852, completed Oct. 21, 2014, dated Dec. 5, 2014, 11 pgs.
International Search Report and Written Opinion for International Application No. PCT/US2011/066927, completed Apr. 3, 2012, dated Apr. 20, 2012, 14 pgs.
International Search Report and Written Opinion for International Application No. PCT/US2011/067167, completed Jun. 19, 2012, dated Jul. 2, 2012, 11 pgs.
International Search Report and Written Opinion for International Application No. PCT/US2011/068276, completed Jun. 19, 2013, dated Jul. 8, 2013, 24 pgs.
International Search Report and Written Opinion for International Application No. PCT/US2013/020572, Search Completed Mar. 19, 2013, dated Apr. 29, 2013, 10 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys, "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 4 pages.
Microsoft Corporation, "Chapter 8, Multimedia File Formats" 1991, Microsoft Windows Multimedia Programmer's Reference, 3 cover pgs., pp. 8-1 to 8-20.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Mircosoft Windows® XP Media Center Edition 2005, Frequently asked Questions, printed May 4, 2007 from http://www.microsoft.com/windowsxp/mediacenter/evaluation/faq.mspx, 6 pages.
Microsoft Windows® XP Media Center Edition 2005: Features, printed May 9, 2007, from http://www.microsoft.com/windowsxp/mediacenter/evaluation/features.mspx, 4 pgs.
Office Action for Chinese Patent Application No. CN200880127586.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
pc world.com, Future Gear: PC on the HiFi, and the TV, Jan. 21, 2003, from http://www.pcworld.com/article/id, 108818-page, 1/article.html, printed May 4, 2007, from IDG Networks, 2 pgs.
Qtv—About BroadQ, printed May 11, 2009 from http://www.broadq.com/en/about.php, 1 pg.
Supplementary European Search Report for Application No. EP04813918, Search Completed Dec. 19, 2012, 3 pgs.
Supplementary European Search Report for Application No. EP10729513, completed Dec. 9, 2013, 4 pgs.

(56) References Cited

OTHER PUBLICATIONS

Widows Media Center Extender for Xbox, printed May 9, 2007 form http://www.xbox.com/en-US/support/systemuse/xbox/console/mediacenterextender.htm, 2 pgs.
Windows® XP Media Center Edition 2005, "Experience more entertainment", retrieved from http://download.mircosoft.com/download/c/9/a/c9a7000a-66b3-455b-860b-1c16f2eecfec/MCE.pdf on May 9, 2007, 2 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container fromat (digital)", printed Aug. 22, 2009 from http://en.wikipedia.org/wiki/Container_format_(digital), 4 pgs.
"Diagram | Matroska", Dec. 17, 2010, Retrieved from http://web.archive.org/web/201 01217114656/http:I/matroska.org/technical/diagram/index.html on Jan. 29, 2016, 5 pages.
"DVD-MPeg differences", printed Jul. 2, 2009 from http://dvd.sourceforge.net/dvdinfo/dvdmpeg.html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for ...-a018239381, 6 pgs.
"Information Technology—Coding of audio-visual objects—Part 14: MP4 file format", International Standard, ISO/IEC 14496-14, First Edition, Nov. 15, 2003, 18 pages.
"Information technology—Coding of audio-visual objects—Part 18: Font compression and streaming", ISO/IEC 14496-18, First edition Jul. 1, 2004, 26 pgs.
"Information technology—Generic coding of moving pictures and associated audio information: Systems", International Standard ISO/IEC 13818-1, Second Edition, Dec. 1, 2000, 174 pages (presented in two parts).
Written Opinion for International Application No. PCT/US2007/063950 filed Mar. 14, 2007, report completed Mar. 1, 2008, report dated Mar. 19, 2008, 6 pgs.
U.S. Appl. No. 13/905,804, "Notice of Allowance," dated Aug. 12, 2015, 8 pgs.
Extended European Search Report for European Application No. 19211286.0, Search completed Jul. 3, 2020, dated Jul. 13, 2020, 9 Pgs.
Extended European Search Report for European Application No. 19211291.0, Search completed Jul. 6, 2020, dated Jul. 14, 2020, 12 Pgs.
International Preliminary report on Patentability for International Application No. PCT/US2005/025845, report dated Jun. 19, 2007, 6 pgs.
International Preliminary Report on Patentability for International Application PCT/US2010/020372, Completed Oct. 6, 2011, 6 Pgs.
Proceedings of the Second KDD Workshop on Large-Scale Recommender Systems and the Netflix Prize Competition, Las Vegas, Nevada, Aug. 24, 2008, 34 pgs.
Wayback Machine, Grooveshark—Features, All Your Music in One Place, printed Aug. 15, 2016 from https://web.archive.org/web/20081013115837/http://www,grooveshark.com/features, 6 pgs.
Written Opinion for International Application No. PCT/US2009/046588, completed Jul. 14, 2009, dated Jul. 23, 2009, 5 pgs.
"Adobe Flash Video File Format Specification", Aug. 2010, Version 10.1, 89 pages.
"Video File Format Specification", Adobe, Apr. 2008, Version 9, 46 pages.
"SWF and FLV File Format Specification", Adobe, Jun. 2007, Version 9, 298 pages.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05V31/free-music-was-never-so-wool-before-grooveshark/, 2 pgs.
"HTTP Live Streaming on the Leading Media CDN", Akamai website, retrieved from http://www.akamai.com/html/resources/http-live-streaming.html, 2015, accessed May 11, 2015, 5 pgs.
"Instantly convert songs into tiny URLs with TinySong", Wayback Machine, Startup Memo Technology Blog, printed Aug. 15, 2016 from https://seb.archive.org/web/2008919133853/http://startupmeme.com/instantly-convert-songs-into-tiny-urls-with-tinysong/, 4pgs.
"Media Delivery Solutions for Streaming Video and Software Delivery", Akamai website, Retrieved from http://www.akamai.com/html/solutions/media-delivery-solutions.html, 2015, Accessed May 11, 2015, 5 pgs.
"Microsoft Announces Breakthrough Technology Enabling Simple Access to Broad Set of Digital Content, Including Music, Games, Video, Ring Tones and Pictures", Microsoft, Feb. 12, 2017, Retrieved from https://news.microsoft.com/2007/02/12/microsoft-announces-breakthrough-technology-enabling-simple-access-to-broad-set-of-digital-content-including-music-games-video-ring-tones-and-pictures/, 5 pgs.
"SDMI Secure Digital Music Initiative", SDMI Portable Device Specification, Part 1, Version 1.0, Jul. 8, 1999, pp. 1-35.
"Twitpic's Future", Twitpic, Oct. 25, 2014, Retrieved from: https://web.archive.org/web/20150521043642/https://blog.twitpic.com/index.html, 12 pgs.
"What is Fliggo?", Wayback Machine, printed Aug. 15, 2016 from https://web.archive.org/web/20080623065120/http://www.fliggo.com/about, 3 pgs.
"DVD-Mpeg differences", printed on Jul. 2, 2009, http://dvd.sourceforge.net/dvdinfo/dvdmpeg.html, 1 pg.
Bell et al., "The BellKor 2008 Solution to the Netflix Prize", Netflix Prize, 2008, 21 pgs.
Catone, Josh, "10 Ways to Share Music on Twitter", Mashable, May 29, 2009, Retrieved from: https://mashable.com/2009/05/29/twitter-music/#vJCdrVzNOOqx, 5 pgs.
Chesler, Oliver, "TinySong is like TinyURL for music", wire to the ear, Jun. 30, 2008, printed Aug. 15, 2016 from https://web.archive.org/web/20080907100459/http://www.wiretotheear.com/20/08/06/30/tinysongis-like-tinyurl-for-music, 8 pgs.
Kalva, Hari, "Delivering MPEG-4 Based Audio-Visual Services", 2001, 113 pgs.
Lew et al., "Content-Based Multimedia Information Retrieval: State of the Art and Challenges", ACM Transactions on Multimedia Computing, Communications and Applications, Feb. 2006, vol. 2, No. 1, pp. 1-19.
Lomas et al., "Educause Learning Initiative, Collaboration Tools", Educause Learning Initiative, Aug. 2008, ELI Paper 2: 2008, 11 pgs.
Montes, "Muusic: mashup de servicios web musicales", Ingenieria Tecnica en Informatica de Gestion, Nov. 2008, 87 pgs.
Sheu, Tsang-Ling et al., "Dynamic layer adjustments for SVC segments in P2P streaming networks", Computer Symposium (ICS), 2010, 2010 International, Tainan, Taiwan, R.O.C., pp. 793-798.
Toscher et al., "The BigChaos Solution to the Netflix Prize 2008", Netflix Prize, Nov. 25, 2008, 17 pgs.
Van Grove, Jennifer, "Top 5 Ways to Share Videos on Twitter", Mashable, May 23, 2009, Retrieved from: https://mashable.com/2009/05/23/video-for-twitter/#Jvn9IIYy6qqA, 6 pgs.
Weng, "A Multimedia Socail-Networking Community for Mobile Devices", 2007, 30 pgs.
3GPP TS 26.247, V10.1.0, 3rd Generation Partnership Project; Technical Specification Group Services and System Aspects Transparent end-to-end Packet-switches Streaming Services (PSS); Nov. 2011, 112 pages.
Chinese Patent Application 201180060590.1 office action dated Aug. 6, 2015, 11 pgs.
Examination report for GB1308663.2, dated May 18, 2016, 3 pgs.
Filed Application and Filing Receipt for U.S. Appl. No. 61/359,748, Application filed Jun. 29, 2010, Receipt mailed Jul. 13, 2010, 38 pages.
Great Britain Application GB1308663.2 search report dated Jan. 5, 2017, 1 pg.

(56) References Cited

OTHER PUBLICATIONS

ISO/IEC 14496-12 Information technology—Coding of audio-visual objects—Part 12: ISO base media file format, Amendment 3: DASH support and RTP reception hint track processing, 2011, 44 pgs.
ISO/IEC CD 23001-6 MPEG systems technologies Part 6: Dynamic adaptive streaming over HTTP (DASH), Oct. 15, 2010, 70 pgs.
ISO/IEC DIS 23009-1, Information technology—Dynamic adaptive streaming over HTTP (DASH)—Part 1: Media presentation description and segment formats, dated Aug. 30, 2011, 132 pgs.
ISO/IEC JTC1/SC29/WG11, MPEG/M18620, Oct. 2010, Test of ISO/IEC 23001-6: Dynamic adaptive streaming over HTTP (DASH), 72 pgs.
ISO/IEC JTC1/SC29/WG11, MPEG/N11578, Test of ISO/IEC 23001-6: Dynamic adaptive streaming over HTTP (DASH), Oct. 2010, 70 pgs.
ISO/IEC JTC1/SC29-WG11—Coding of Moving Pictures and Audio, MPEG2010/M18692, Jan. 2010, 10 pgs.
Search Report for Canadian Patent Application 2,816,621, dated Oct. 30, 2014, 6 pgs.
Search report for European Patent Application 11838186.2, dated Jul. 13, 2017, 6 pgs.
Hunt, "Encoding for streaming", The Netflix Blog, Nov. 6, 2008, printed from https://web.archive.org/web/20081216044437/http:/blog.netflix.com/2008/11/encoding-for-streaming.htm., retrieved on Feb. 8, 2022, 28 pgs.
Pereira, "Security on Over the Top TV Services", Thesis, Nov. 2011, 114 pgs.
Stockhammer, "MPEG's Dynamic Adaptive Streaming over HTTP (DASH)—An Enabling Standard for Internet TV", Qualcomm Incorporated, Apr. 11, 2015, Retrieved from the Internet, https://www.w3.org/2011/09/webtv/slides/W3C-Workshop.pdf, 30 pgs.
Extended European Search Report for European Application No. 21208230.9, Search completed Feb. 18, 2022, dated Mar. 1, 2022, 15 Pgs.
"Pixel aspect ratio—Wikipedia", Nov. 24, 2010, pp. 1-8.

* cited by examiner

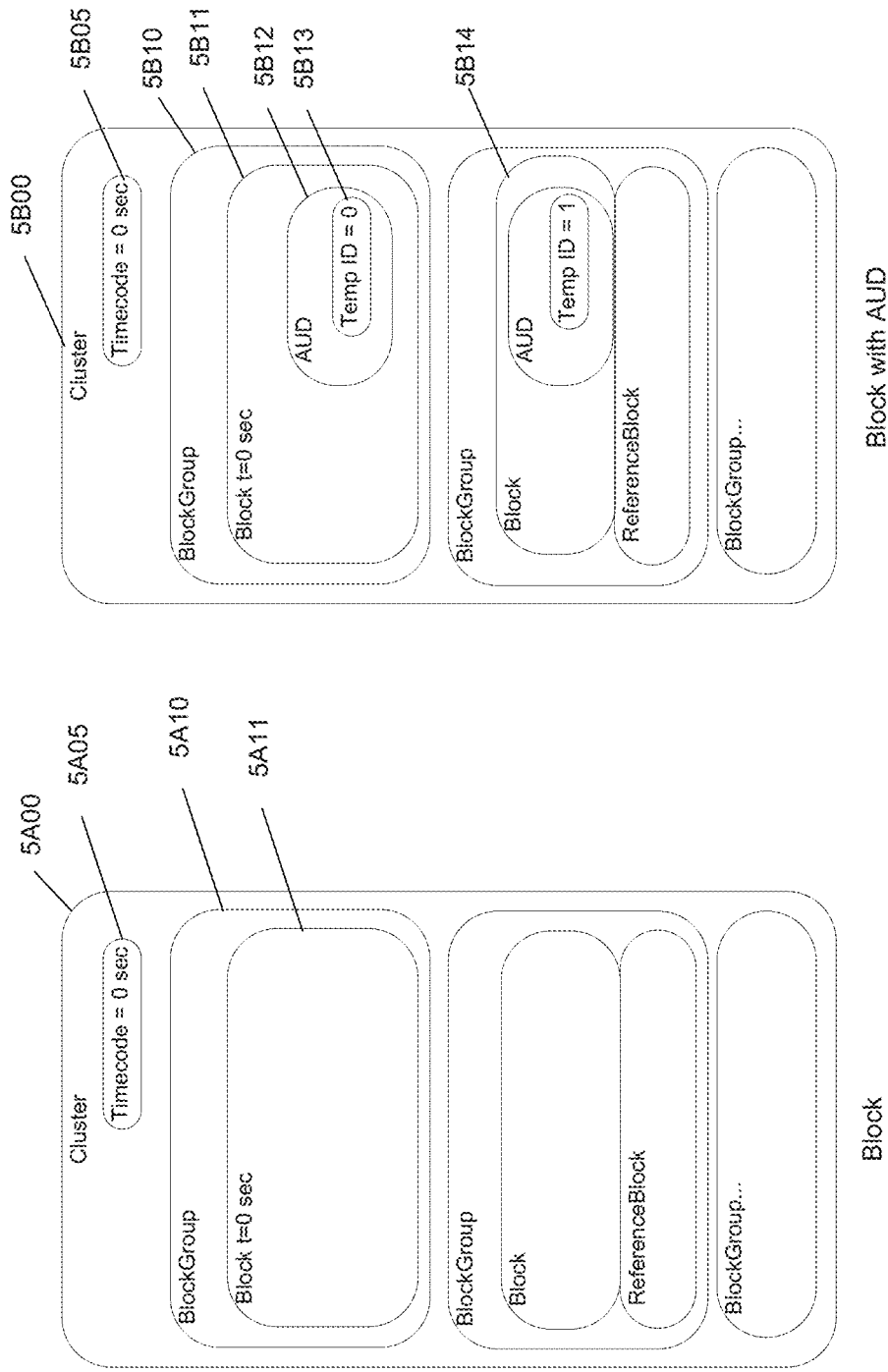

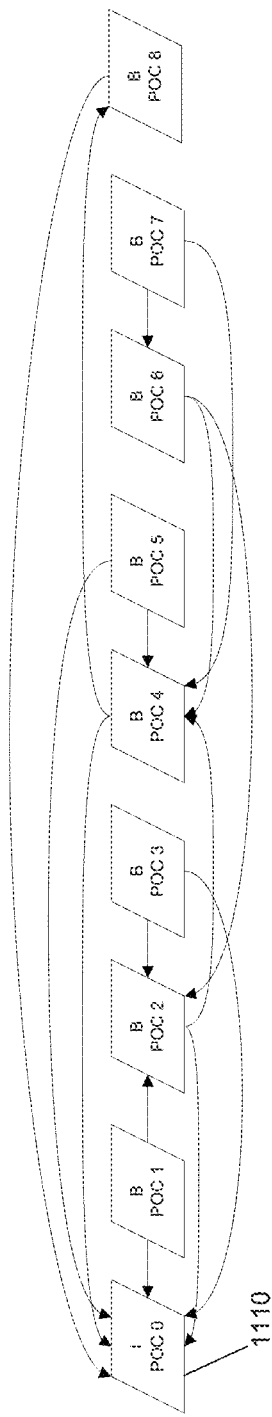

| AUD (TID = 0) | AUD (TID = 0) | AUD (TID = 0) | AUD (TID = 1) | AUD (TID = 0) | AUD (TID = 1) | AUD (TID = 0) | AUD (TID = 1) | AUD (TID = 1) |
|---|---|---|---|---|---|---|---|---|
| POC = 0 Video Data | POC = 8 Video Data | POC = 4 Video Data | POC = 2 Video Data | POC = 1 Video Data | POC = 3 Video Data | POC = 6 Video Data | POC = 5 Video Data | POC = 7 Video Data |

FIG 12A

Stream for Base Layer (TID = 0):

| POC = 0 Video Data | POC = 8 Video Data | POC = 4 Video Data | POC = 2 Video Data | POC = 6 Video Data |
|---|---|---|---|---|

(12B10)

Stream for Enhancement Layer (TID = 1):

| POC = 1 Video Data | POC = 3 Video Data | POC = 5 Video Data | POC = 7 Video Data |
|---|---|---|---|

SYSTEMS AND METHODS FOR ENCODING AND PLAYING BACK VIDEO AT DIFFERENT FRAME RATES USING ENHANCEMENT LAYERS

RELATED APPLICATIONS

This application is a continuation of U.S. application Ser. No. 16/436,429 entitled "Systems and Methods for Encoding and Playing Back Video at Different Frame Rates Using Enhancement Layers" to van der Schaar et al., filed Jun. 10, 2019, which is a continuation of U.S. application Ser. No. 15/863,456 entitled "Systems and Methods for Encoding and Playing Back Video at Different Frame Rates Using Enhancement Layers" to van der Schaar et al., filed Jan. 5, 2018, which is a continuation of U.S. application Ser. No. 14/679,469 entitled "Systems and Methods for Encoding and Playing Back Video at Different Frame Rates Using Enhancement Layers" to van der Schaar et al., filed Apr. 6, 2015, which claims priority to U.S. patent application Ser. No. 61/975,789 entitled "Systems and Methods for Encoding and Playing Back Video at Different Frame Rates Using Enhancement Layers" to van der Schaar et al., filed Apr. 5, 2014, the disclosures of which are incorporated herein by reference in their entireties..

FIELD OF THE INVENTION

The present invention generally relates to encoding and playback of video content and more specifically to the use of metadata to enable playback of media at different frame rates.

BACKGROUND OF THE INVENTION

Media distributed by content providers to content consumers can be encoded using a variety of video compression standards that facilitate the distribution of the content across a distribution channel. Well know compression standards include H.264/MPEG-4, published by the ITU-T Video Coding Experts Group (VCEG) together with the ISO/IEC JTC1 Moving Picture Experts Group (MPEG), and the newer High Efficiency Video Coding (HEVC) standard, MPEG-H Part 2, developed by MPEG and VCEG, both of which are herein incorporated by reference. Video compression or video encoding involves compressing the amount of information used to describe the frames of video in a video sequence in order to reduce the consumption of network resources that are utilized when distributing content via a network. The reduced size also facilitates the distribution of content on non-volatile storage mediums such as CD-ROMs and flash-drives.

Media playback devices can utilize video decoders to decode encoded video for playback. Video can be encoded using predetermined encoding profiles. Typically, playback devices utilize decoders that are capable of playing back video encoded using one or more profiles. A particular profile may specify parameters and limits for various video settings, including picture resolution (e.g., 720 p, 1080 p, 4 k etc.), frame rate (i.e., 24, 30, 48, 60 frames per second, etc.), and bitrate (e.g., 12 Mbps, 40 Mbps, etc.).

Encoded media is typically stored in one or more container files. The most commonly used media container formats are the MP4 container format specified in MPEG-4 Part 14 (i.e., ISO/IEC Standard 14496-14) and the MPEG transport stream (TS) container specified in MPEG-2 Part 1 (i.e., ISO/IEC Standard 13818-1). The Matroska container is a media container developed as an open standard project by the Matroska non-profit organization of Aussonne, France. The Matroska container is based upon Extensible Binary Markup Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e., is based upon the Matroska container format, but includes elements that are not specified within the Matroska format).

Furthermore, encoded video can be distributed to devices through different mechanisms, including downloading from a server for storage and future playback on the device, streaming the encoded video during playback on the device, and retrieving the encoded video from one or more files stored on a CD-ROM, flash drive, or other non-volatile storage medium, and various other storage and distribution mechanisms. Streaming solutions typically utilize either Hypertext Transfer Protocol (HTTP), published by the Internet Engineering Task Force and the World Wide Web Consortium as RFC 2615, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state. Thus, content providers utilize different distribution protocols for each of the different mechanisms (i.e., download vs. streaming) for distributing video files to different devices.

SUMMARY OF THE INVENTION

Systems and methods in accordance with embodiments of this invention encode and play back video at different frame rates using enhancement layers. In an embodiment of the invention, a non-transitory machine readable medium containing processor instructions, where execution of the instructions by a processor causes the processor to perform a process that includes receiving video having several access units and encoding the video into a set of layers that includes a base layer and at least one enhancement layer, where the encoding includes: (i) using a temporal identifier of each access unit to determine the particular layer associated with the access unit and (ii) retaining an order of the temporal identifiers of the several access units of the video.

In another embodiment, the temporal identifier of an access unit is stored in an initial set of bits of the access unit.

In yet another embodiment, a process inserts a temporal identifier for a set of access units of the several access units of the video.

In still another embodiment, a process inserts a metadata tag providing information regarding the layers available and the frame rate of each layer.

In still yet another embodiment, a process receives a request for streaming of the video, determines playback capabilities of a device requesting the video, and streams different sets of layers of the video based on the playback capabilities of the device, where (i) the base layer is streamed to a playback device capable of playing back the base layer and (ii) the base layer and at least one enhancement layer is streamed to a playback device capable of streaming the plurality of layers.

In a further embodiment, streaming the different sets of layers includes merging the different layers using the retained order of the temporal identifiers of the plurality of access units of the video.

In another embodiment, a process receives a request for downloading of the video from a playback device and provides the encoded video to the playback device.

In another embodiment again, a frame rate of at least one enhancement layer is an integer multiple of the base layer.

In yet another embodiment again, a process stores each layer as a separate stream.

In still yet another embodiment again, a process stores each layer in a separate container file.

In an embodiment of the invention provides a source encoder that includes a processor configured by a source encoder application to receive video having several access units and encode the video into a set of layers that includes a base layer and at least one enhancement layer, where the encoding includes: (i) using a temporal identifier of each access unit to determine the particular layer associated with the access unit and (ii) retaining an order of the temporal identifiers of the plurality of access units of the video;

In another embodiment, a temporal identifier of an access unit is stored in a header of the access unit.

In yet another embodiment, a source encoder inserts a temporal identifier for a set of access units of the several access units of the video.

In still a further embodiment, a source encoder inserts a metadata tag providing information regarding the layers available and the frame rate of each layer.

An embodiment of the invention includes a playback device configured to playback video that includes a processor configured to communicate with a memory, where the memory contains a client application, where the client application configures the processor to receive video that includes several access units, playback the video, where the playback device plays back the video (i) using a base layer when the playback device has a first set of playback capabilities and (ii) using the base layer and at least one enhancement layer when the playback device has a second set of playback capabilities.

In another embodiment, a client application further configures the processor to identify an order of temporal identifiers of the several access units of the video and merge the access units of the base layer and the access units of at least one enhancement layer using the order of temporal identifies of the several access units of the video.

In yet another embodiment, a client application further configures the processor to request streaming of the video to a playback server and provide information regarding playback capabilities of the playback device to the playback server and receive a first stream that includes the base layer of the video and a second stream that includes the at least one enhancement layer of the video.

In still yet another embodiment, a client application further configures the processor to request downloading of the video to a content distribution server and provide playback capabilities of the playback device to the content distribution server, receive the video from the content distribution server, where a first device receives video that includes the base layer when the first device is capable of playing back the video at a first frame rate and a second device receives video that includes the base layer and at least one enhancement layer when the second device is capable of playing back the video at a second frame rate.

In yet another embodiment again, a client application further configures the processor to retrieve a metadata tag from the video identifying the layers available and the frame rate of each layer; and determine a set of layers to playback based on the information in the metadata tag.

In a further embodiment again, a client application further configures the processor to identify the temporal identifier of an access unit by parsing an initial set of bytes of the access unit.

BRIEF DESCRIPTION OF THE DRAWINGS

FIG. 5A conceptually illustrates a Clusters element of a Matroska container file containing encoded video in accordance with an embodiment of the invention.

FIG. 5B conceptually illustrates a Cluster element for use in the playback of encoded video with temporal scalability.

FIG. 11A conceptually illustrates the reference dependencies that may exist between a set of video frames in accordance with an embodiment of the invention.

FIG. 11B conceptually illustrates a table providing a decode order for frames of an encoded video in accordance with an embodiment of the invention.

FIG. 12A conceptually illustrates a portion of an encoded video stream containing several frames in accordance with embodiments of the invention.

FIG. 12B conceptually illustrates separate streams generated for encoded video in accordance with embodiments of the invention.

DETAILED DISCLOSURE OF THE INVENTION

Figure 1:
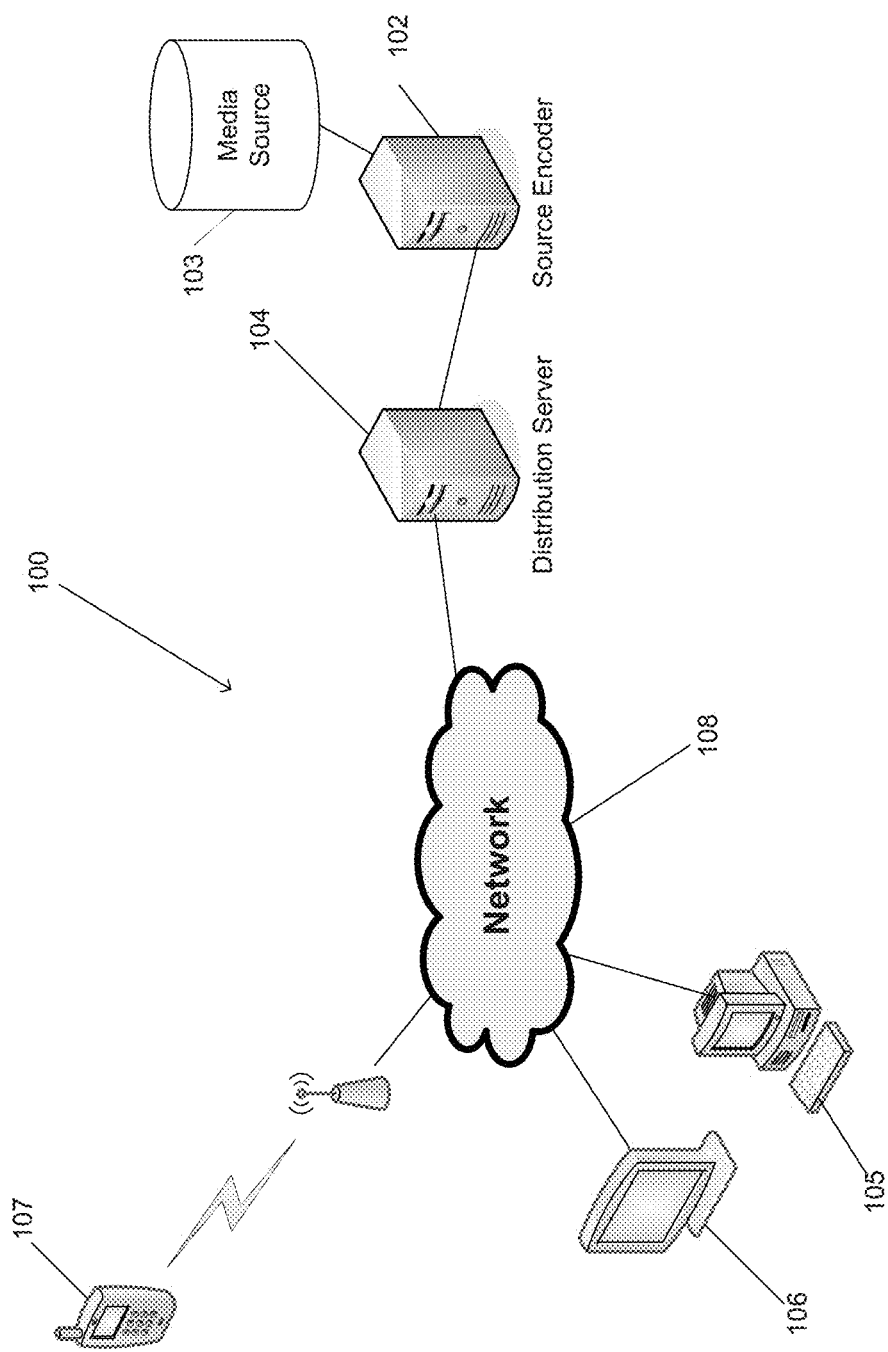
FIG. 1 is a network diagram of a system for encoding and playing back video at different frame rates using enhancement layers in accordance with an embodiment of the invention.

Turning now to the drawings, systems and methods for encoding and playing back video at different frame rates using enhancement layers in accordance with embodiments of the invention are illustrated. In a number of embodiments, video is encoded using temporal scalability involving the creation of a base layer at a first frame rate and an enhancement layer including additional frames enabling playback at a second higher frame rate. The second higher frame rate can also be referred to as an enhanced frame rate. In a number of embodiments, the base and enhancement layers are stored in one or more container files that contain metadata describing the enhancement layer. Based on the capabilities of a playback device, it can select the particular frame rate at which to playback encoded video. For example, for a single media file containing video encoded with temporal scalability that provides both a base frame rate (e.g., 30 fps) and an enhanced frame rate (e.g., 60 fps), a first device may only be able to play back the encoded video at the base frame rate while a different device may be able to playback encoded video at the enhanced frame rate. Thus, video content can be played back at different frame rates on different devices.

In several embodiments, encoded video can be distributed to playback devices using a variety of distribution mechanisms, including downloading of one or more files containing the encoded video or streaming the encoded video to the playback device for progressive playback and/or as part of an adaptive bitrate streaming system. However, in order to avoid wasting network resources when streaming encoded video that includes temporal scalability to a device that is not capable of handling the decoding of the enhancement layer (s), in some embodiments the different video layers are separated and streamed on an "as needed" basis to the playback device. For example, for a file containing encoded video that has both a base video layer that provides a base frame rate of 30 fps and an enhancement layer that provides a frame rate of 60 fps, a first device with only the capacity to playback video at a frame rate of 30 fps can request a stream of only the base layer of the encoded video while a second device that has the capacity to playback the video at a frame rate of 60 fps can request streams containing both the base video layer and the enhancement layer.

When streaming multiple separate video layers to a user's device, the streams can be combined at the playback device into a single stream in order to allow for the playback of the encoded video on the device at the enhanced frame rate. Due to dependencies that can exist between encoded frames of video (specifically bi-directionally encoded frames of video), the frames of video in the base layer and/or the enhancement layer may not be received by the playback device in the order in which they are to be played back. In several embodiments, the frames of video in the base and/or enhancement layers are received in "decode order", which is an order that causes the decoder to have fully decoded all frames on which a given frame depends prior to decoding the given frame. In order to determine the particular decode order, in some embodiments, one or more of the enhancement layers include metadata that specifies a sequential order for selecting frames of video from the different layers to merge the frames into a single stream for decoding and playback at the enhanced frame rate.

Some embodiments utilize an adaptive streaming mechanism that detects the present streaming conditions (e.g., the user's network bandwidth and CPU capacity) in real time and adjusts the frame rate of the streamed video accordingly. When a playback device has the capability to play back the video file at an enhanced frame rate, the playback device can stream both the base and enhancement layers when the network bandwidth is sufficient to satisfy that bitrate necessary for transmission and/or the CPU has capacity to process the encoded video at the enhanced rate. The playback device may likewise stream the encoded video at the base rate when a change in the streaming conditions is detected indicative of insufficient bandwidth for the enhanced frame rate and/or the CPU no longer has capacity to process the encoded video at the enhanced frame rate.

In several embodiments, the base layer includes a sequence of frames encoded at a first frame rate in such a way that the frames in the base layer are only dependent upon other frames in the base layer. In a number of embodiments, the enhancement layer includes additional frames that, when merged with the sequence of frames in the base layer, form a sequence of frames encoded at a second frame rate. In certain embodiments, the frames in the enhancement layer are encoded so that they are only dependent upon frames in the base layer. In a number of embodiments, the frames in the enhancement layer are further constrained so that the enhancement layer does not include any I-frames (i.e., frames that can be decoded without reference to other frames). In other embodiments, the enhancement layer can include frames that incorporate dependencies upon other frames in the enhancement layer and/or I-frames.

In some embodiments, the source video is encoded and decoded using codecs implemented in accordance with the HEVC standard. In order to signal the availability of temporal scalability (i.e., the existence of at least one enhancement layer), the files containing the encoded video can include a metadata tag that provides information regarding the available layers within the media file and the frame rate of each layer. In several embodiments, at least one enhancement layer includes metadata in the form of an ordered set of Access Unit Delimiters (AUDs) that specify a sequential order for selecting access units from different layers. In particular, each AUD identifies the specific layer containing the video data of the Access Unit and this information can be used to determine the manner in which the Access Units from the different layers are combined into a single video stream. In some embodiments, the multiple streams are combined on the user's playback device prior to being provided to the decoder on the device. In other embodiments, the separate streams are combined into a single stream by the content provider prior to their streaming to the user's device.

System and methods for encoding and playing back video at different frame rates using enhancement layers in accordance with embodiments of the invention are discussed further below.

System Architecture for Encoding and Playing Back Video at Different Frame Rates Using Enhancement Layers A system for encoding and playing back video at different frame rates using enhancement layers in accordance with an embodiment of the invention is illustrated in FIG. 1. The system 100 includes a source encoder 102 configured to encode source media into encoded video. In many embodiments, the source encoder encodes the video using temporal scalability, which allows the encoded video to be played back at different frame rates. In the illustrated embodiment, the source encoder is a server. In other embodiments, the source encoder can be any processing device including a processor and sufficient resources to perform the transcoding of source media including (but not limited to) video, audio, and/or subtitles.

As is discussed further below, in many embodiments, the source encoder is able to encode a video with temporal scalability by creating a base layer of video frames that allow playback at a base frame rate and one or more enhancement layers of video frames that allow playback at a higher enhanced frame rate. In many embodiments, the source encoder stores the encoded video in one or more container files. In some embodiments, the encoded video is then uploaded to distribution server 104. In many embodiments, source encoder uploads the encoded video as a single file containing multiple temporal layers. In several embodiments, the encoded video is uploaded as one or more separate streams, with each stream corresponding to a particular temporal layer of the encoded video. In many embodiments, each stream can be stored in a separate container file (e.g., Matroska container file) while in other embodiments the streams are stored in the same container file. A device 105-107 may then request either to (i) download the entire file, or (ii) receive a streamed video for progressive playback. In some embodiments, the streamed video provides either the base layer of video data when the requested stream is at the base frame rate or the base layer and one or more enhancement layers when the requested stream is at a higher enhanced frame rate.

In many embodiments, the encoded video is stored in Matroska container files. As is discussed further below, the encoded video can be stored within the Matroska container file in a way that facilitates the embedding of metadata within a file containing encoded video that describes any enhancement layers that may be available to achieve playback of the content at an enhanced frame rate. In many embodiments, the Matroska container files are specialized Matroska container files that include enhancements (i.e., elements that do not form part of the Matroska file format specification) that facilitate the retrieval of the video at different frame rates via HTTP or RTSP during the streaming of the video. The enhancements to the Matroska container file can also include storing metadata that provides information regarding the temporal layers that are available for the encoded video and the frame rate of each layer.

In many embodiments, the distribution server receives and processes download requests from a variety of playback devices 105-107 that seek to download the encoded video. When the distribution server receives a download request from a playback device, it can provide the playback device with the encoded video for storage. A downloaded video file may include a header that contains metadata describing temporal layers within the video file and the video data stored within the various temporal layers. In some embodiments, the temporal layers provided to a playback device may include only the base layer when the device requests the encoded video at the base frame rate or both the base layer and one or more enhancement layers when the device requests the encoded video at the enhanced frame rate.

In some embodiments, the distribution server receives stream requests from a variety of playback devices and subsequently streams the encoded video to the playback devices for progressive playback and/or as part of an adaptive bitrate streaming system. In several embodiments, the variety of playback devices can use HTTP or another appropriate stateless protocol to request streams via a network 108 such as the Internet. In several embodiments, a variety of playback devices can use RTSP whereby the distribution server records the state of each playback device and determines the video to stream based upon instructions received from the playback devices and stored data describing the state of the playback device.

Playback devices with different playback capacities may request different streams from the distribution server. For example, for a particular video that has been encoded with temporal scalability, a device with only the capacity to playback the encoded video at a base frame rate can request a stream from the distribution server that contains only the base layer. The distribution server would then stream only the base layer of the encoded video to the playback device. Likewise, a device with the capacity to playback video at the enhanced frame rate can request the distribution server to provide streams that contain both the base layer and the one or more enhancement layers whereby the distribution server would stream both layers to the playback device. By allowing a device to request only the particular layers that the device is capable of decoding, the system is able to avoid wasting network resources that would otherwise be needed to provide all layers to every device, including those without the capacity to handle the enhancement layers.

As described above, in order to enable playback of the video, the separate streams can be merged according to the decode order of the video frames. Thus, in many embodiments, when a device requests a stream at the enhanced frame rate, the distribution server first merges the separate temporal streams and sends a single ordered stream of video to the device. In other embodiments, the playback device is responsible for merging the separate streams into the single ordered stream prior to providing the stream to a decoder on the playback device for play back of the video stream.

In the illustrated embodiment, playback devices include personal computers 105-106 and mobile phones 107. In other embodiments, playback devices can include consumer electronics devices such as DVD players, Blu-ray players, televisions, set top boxes, video game consoles, tablets, and other devices that are capable of connecting to a server via HTTP and playing back encoded video. Although a specific architecture is shown in FIG. 1 any of a variety of architectures can be utilized that enable playback devices to request video at different frame rates as appropriate to the requirements of specific applications in accordance with embodiments of the invention.

Figure 2:
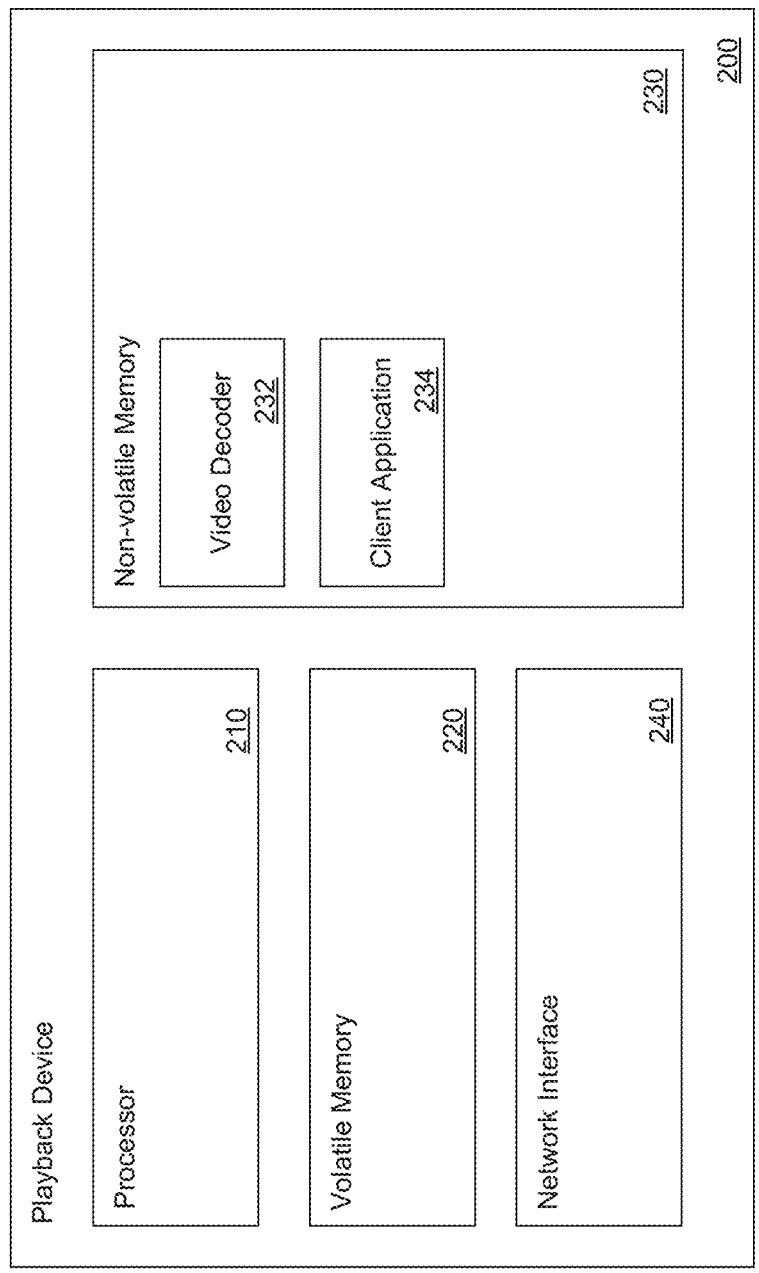
FIG. 2 conceptually illustrates a basic architecture of a playback device in accordance with an embodiment of the invention.

The basic architecture of a playback device in accordance with an embodiment of the invention is illustrated in FIG. 2. The playback device 200 includes a processor 210 in communication with non-volatile memory 230, volatile memory 220, and a network interface 240. In the illustrated embodiment, the non-volatile memory includes a video decoder 232 that configures the processor to decode video and a client application 234 configured to buffer streamed video and deliver the streamed video to the video decoder 232. In several embodiments, the network interface 240 may be in communication with the processor 210, the volatile memory 220, and/or the non-volatile memory 230. Although a specific playback device architecture is illustrated in FIG. 2, any of a variety of architectures including architectures where the video decoder is located on disk or some other form of storage and is loaded into volatile memory at runtime can be utilized to implement playback devices in accordance with embodiments of the invention.

Stream Selection of Video Encoded with Temporal Scalability

Figure 3:
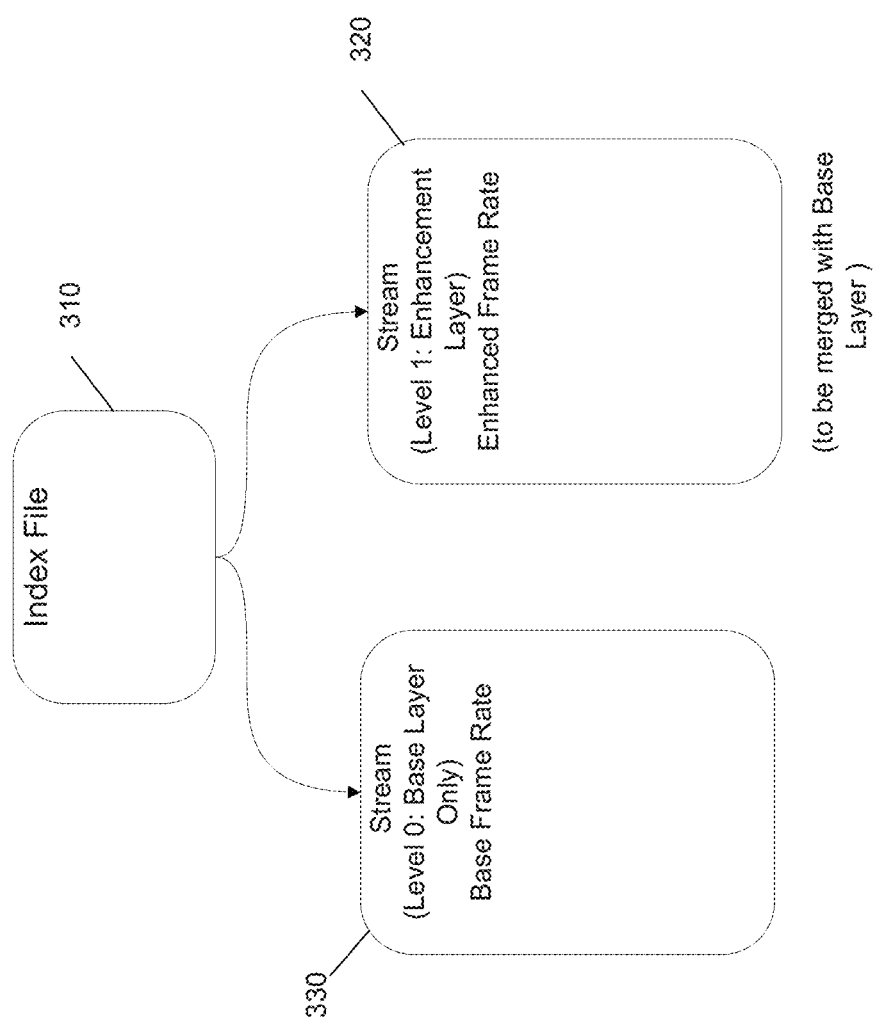
FIG. 3 conceptually illustrates streams for streaming to playback devices in accordance with embodiments of the invention.

As described above, different classes of devices may request different streams from the distribution server in order to play back a video at different frame rates. Streams generated by a source encoder and/or stored on a distribution server for streaming to playback devices in accordance with embodiments of the invention are illustrated in FIG. 3. The files utilized in the streaming of the source video include a top-level index file 310 and a plurality of container files 320-330 that each contain a different stream, each stream corresponding to a particular temporal layer of the encoded video. In several embodiments, the top level index file describes the content of each of the container files. In a number of embodiments, the plurality of container files includes files containing additional streams encoded at different resolutions, pixel aspect ratios, and/or maximum bitrates and the top level provides information that can be utilized to perform adaptive bitrate streaming of the content contained within the container files. As is discussed further below, the container files can take a variety of forms including (but not limited to) a Matroska (MKV) container file and/or a modified or specialized version of a Matroska container file.

In many embodiments, each Matroska container file contains a single stream that corresponds to a particular temporal layer of the encoded video. For example, a first stream could contain video frames for a base layer of the encoded video and a second stream could contain the video frames for one or more enhancement layers. In some embodiments, each stream includes only the video data for the particular layer. Thus, in many embodiments, in order to play back the video at an enhanced rate, the video data from the different layers can be combined into a single stream prior to being sent to the decoder. As can readily be appreciated, the combination of streams can occur at the server and/or at the playback device. In several embodiments, at least one enhancement layer includes metadata in the form of an ordered set of Access Unit Delimiters (AUDs) that provide the order for selecting access units from different layers (or streams). In particular, each AUD identifies the particular layer containing the video data of the Access Unit and this information can be used to determine the manner in which the Access Units from the different layers are combined into a single video stream.

As is discussed further below, in many embodiments the Matroska container files are specialized files. The encoding of the video and the manner in which the video is stored within elements within the Matroska container file can be subject to constraints designed to enhance the performance of a streaming system for playing video encoded with temporal sub-layers. In addition, the Matroska container file can include index elements that facilitate the location and downloading of frames of video (i.e., Access Units) from the various Matroska container files during the streaming of the media. Specialized Matroska container files that can be used in adaptive bitrate streaming systems are proposed by DivX, LLC in U.S. patent application Ser. No. 13/221,682, entitled "Systems and Methods for Adaptive Bitrate Streaming of Media Stored in Matroska Container Files Using Hypertext Transfer Protocol", filed Aug. 30, 2011, the disclosure of which is hereby incorporated by reference in its entirety. Matroska container files that can be used in streaming systems that distribute video encoded with temporal layers in accordance with embodiments of the invention are discussed below.

Storing Encoded Video with Temporal Layers in Matroska Files

Figures 4A, 4B:
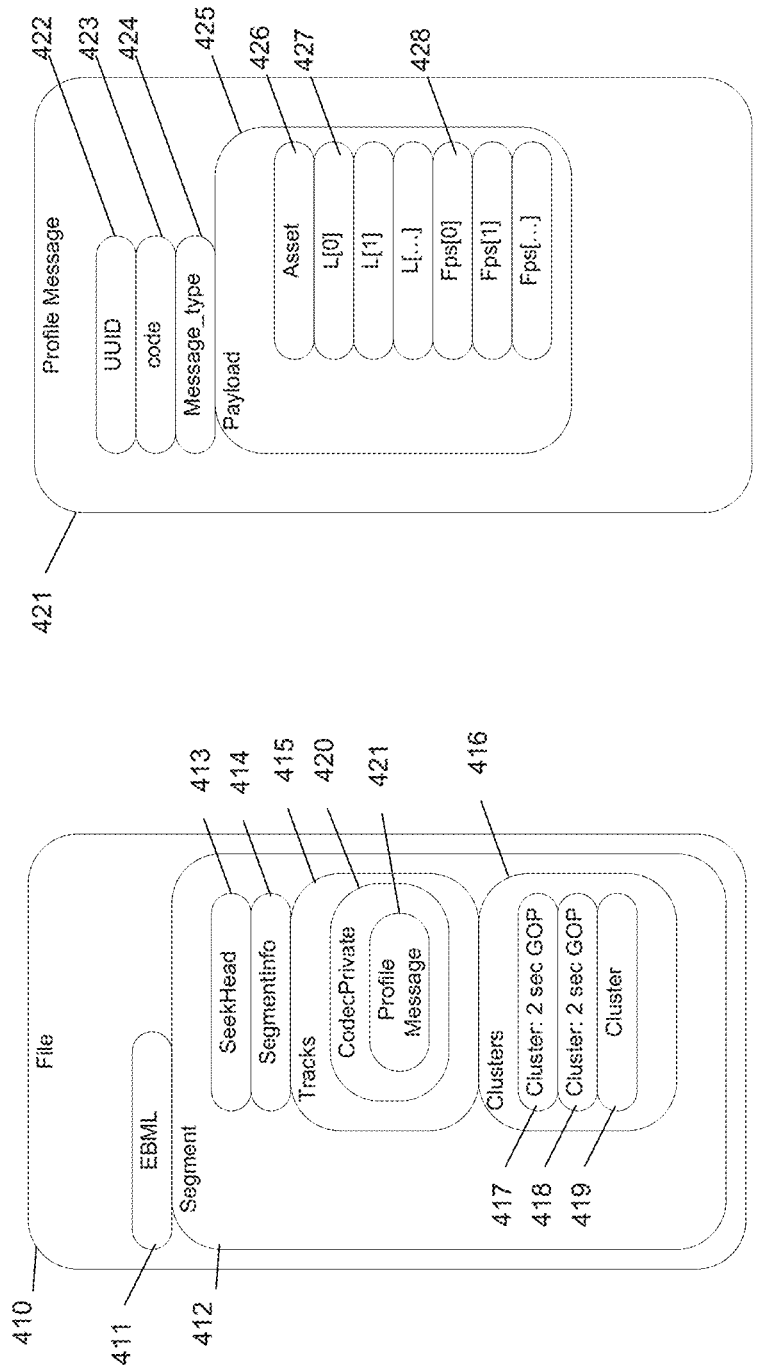
FIG. 4A conceptually illustrates a Matroska container file used to store encoded video in accordance with an embodiment of the invention.
FIG. 4B conceptually illustrates a metadata tag contained within a container file that includes video encoded with temporal scalability in accordance with an embodiment of the invention.

A Matroska container file used to store encoded video in accordance with an embodiment of the invention is illustrated in FIG. 4A. The container file 410 is an Extensible Binary Markup Language (EBML) file that is an extension of the Matroska container file format. The specialized Matroska container file 410 includes a standard EBML element 411, and a standard Segment element 412 that includes a standard Seek Head element 413, a standard Segment Information element 414, and a standard Tracks element 415. These standard elements describe the video contained within the Matroska container file. The Segment element 412 also includes a standard Clusters element 416. As is described below, the manner in which encoded video is inserted within individual Cluster elements 417-419 within the Clusters element 416 is constrained to improve the playback of the media in a streaming system. In many embodiments, the constraints imposed upon the encoded video are consistent with the specification of the Matroska container file format and involve encoding the video so that each cluster includes at least one closed GOP commencing with an IDR or "I" frame. The Clusters element 416 includes a plurality of Cluster elements 417-419 that each contains a discrete portion of encoded video. In the illustrated embodiment, each Cluster element 417-419 includes two seconds of encoded video. In other embodiments, the Cluster elements include encoded video having a greater or lesser duration than two seconds. In several embodiments, the encoded video sequences in the Cluster elements have different durations.

In addition to the above standard elements, the Segment element 412 also includes a modified version of the standard Tracks element 415. As is discussed further below, the Tracks element includes a standard Codec Private element 420. The Codec Private element includes a specialized Profile Message element 421 (e.g., the DivX™ HEVC Profile Tag specified by DivX, LLC of San Diego, Calif.) that is used to (i) signal the availability of temporal scalability for the encoded video and (ii) provide information regarding the temporal layers that are available and corresponding frame rates of each available layer. In some embodiments, the temporal scalability of encoded video can be quickly detected based on the presence of this tag within the container file and/or the presence of similar information within a top level index file.

FIG. 4B illustrates an embodiment of a Profile Message element 421 contained within an enhanced Matroska container file that contains video encoded with temporal scalability. The UUID element 422 is an identifying 128-bit self-generated universally unique identifier. The UUID can be used for multiple purposes, from tagging objects with an extremely short lifetime, to reliably identifying very persistent objects across a network. The UUID may be optionally registered as an Object Identifier Repository (OID) with the International Telecommunication Union (ITU), with headquarters in Geneva, Switzerland. The Code element 423 is an identifier identifying the entity associated with the particular codec used to encode the video. For example, when the codec is a DivX HEVC codec provided by DivX, LLC, the Code element 423 can be a bit sequence spelling "DivX HEVC" when read as a sequence of unsigned characters. The Message Type element 424 is a message format indicator. For example, if the Message Type is "0×20" then the Profile Message 421 is in a text format. In some embodiments, the type zero is prohibited and several type values may be reserved. In other embodiments, any Message Type element can be utilized as appropriate to the requirements of a specific application.

The Payload element 425 includes an Asset element 426, Layers L[0] through L[ . . . ] 427, and Frame Rate Per Seconds "FPS" elements FPS[0] through FPS[ . . . ] 428. The Asset element 426 includes the UUID identifying the video file encoded with temporal scalability. As described above, the encoded video can be separated into several temporal layers, with each layer having frames of video that can be merged with a base layer to achieve a particular enhanced frame rate. Each separated layer has the same UUID, which is used to verify and track the different layers. Layers L[0] through L[ . . . ] provide a numerical value (i.e., 0 or 1) that can be used to determine whether the particular layer is available. The FPS[0] through FPS[ . . . ] provide the frame rate (i.e., frames per second) of each corresponding layer. In some embodiments, the frame rate of each layer is fixed and can be an integer multiple of the base layer. Although FIG. 4B illustrates an example of a Profile Message element that can be used to provide information regarding the temporal scalability of an encoded video, any of a variety of information can be included in the container file that enables playback devices to detect and playback video at different frame rates as appropriate to the requirements of specific applications.

As described, the encoded video can be inserted within individual Cluster elements of the MKV container. A standard (i.e., none enhanced) Clusters element of a Matroska container file containing encoded video in accordance with an embodiment of the invention is illustrated in FIG. 5A. Each Cluster element 5A00 includes a Timecode element 5A05 indicating the start time of the encoded video within the Cluster element and a plurality of BlockGroup elements 5A10. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame (i.e., key-frame) enforces the constraint. In the illustrated embodiment, the first Block-Group element contains an IDR frame. Therefore, the BlockGroup element does not include a ReferenceBlock element. The BlockGroup element 5A10 includes a Block element 5A11, which specifies the Timecode attribute of the video frame encoded within the Block element relative to the Timecode of the Cluster element 5A00. In the illustrated embodiment, subsequent BlockGroup elements are not restricted in the types of video frames that they can contain (other than that they cannot reference frames that are not contained within the Cluster element). Therefore, subsequent BlockGroup elements can include ReferenceBlock elements referencing other BlockGroup element(s) utilized in the decoding of the video frame contained within the Block element of the BlockGroup. Alternatively, subsequent BlockGroup elements can contain IDR frames and are similar to the first BlockGroup element. As discussed below, when an enhancement layer is contained within a container file separate from the base layer, the frames in the BlockGroup elements may be restricted to only reference frames of video from the base layer.

FIG. 5B illustrates a modified (non-standard) Cluster element 5B00 for use in the playback of encoded video with temporal scalability. In particular, each Block element 5B11 includes an Access Unit Delimiter 5B12 ("AUD") that is used to indicate the boundaries between Blocks (i.e., Access Units or frames of video) of a video file. The AUD also contains a Temporal I.D. element 5B13 that identifies the temporal layer of a particular Block (i.e., the layer to store a particular video frame). In many embodiments, the encoder can be configured to insert an AUD and Temporal I.D. for every Block in in an encoded video. In some embodiments, the AUD is only present when there is more than one temporal layer in an encoded video. In many embodiments, a decoder is able to obtain the Temporal I.D. associated with a particular Block by only parsing the first few bytes of each Block. As illustrated in FIG. 5B, Block 5B11 has a Temporal I.D. of 0, which indicates that the video data contained within this Block is for a frame that is stored within the base layer of the encoded video. Likewise, Block 5B14 has a Temporal I.D. of 1, which indicates that the video data contained within this Block is for a frame of video that is stored within one of the enhancement layers.

In the example illustrated in FIG. 5B, the different temporal layers of the encoded video are contained within a single MKV container file. However, in many other embodiments, each separate temporal layer of the encoded video can be stored in a separate MKV container file. This can be particularly useful in a streaming context where only certain temporal layers may be needed by different playback devices with different playback profiles.

Figure 6:
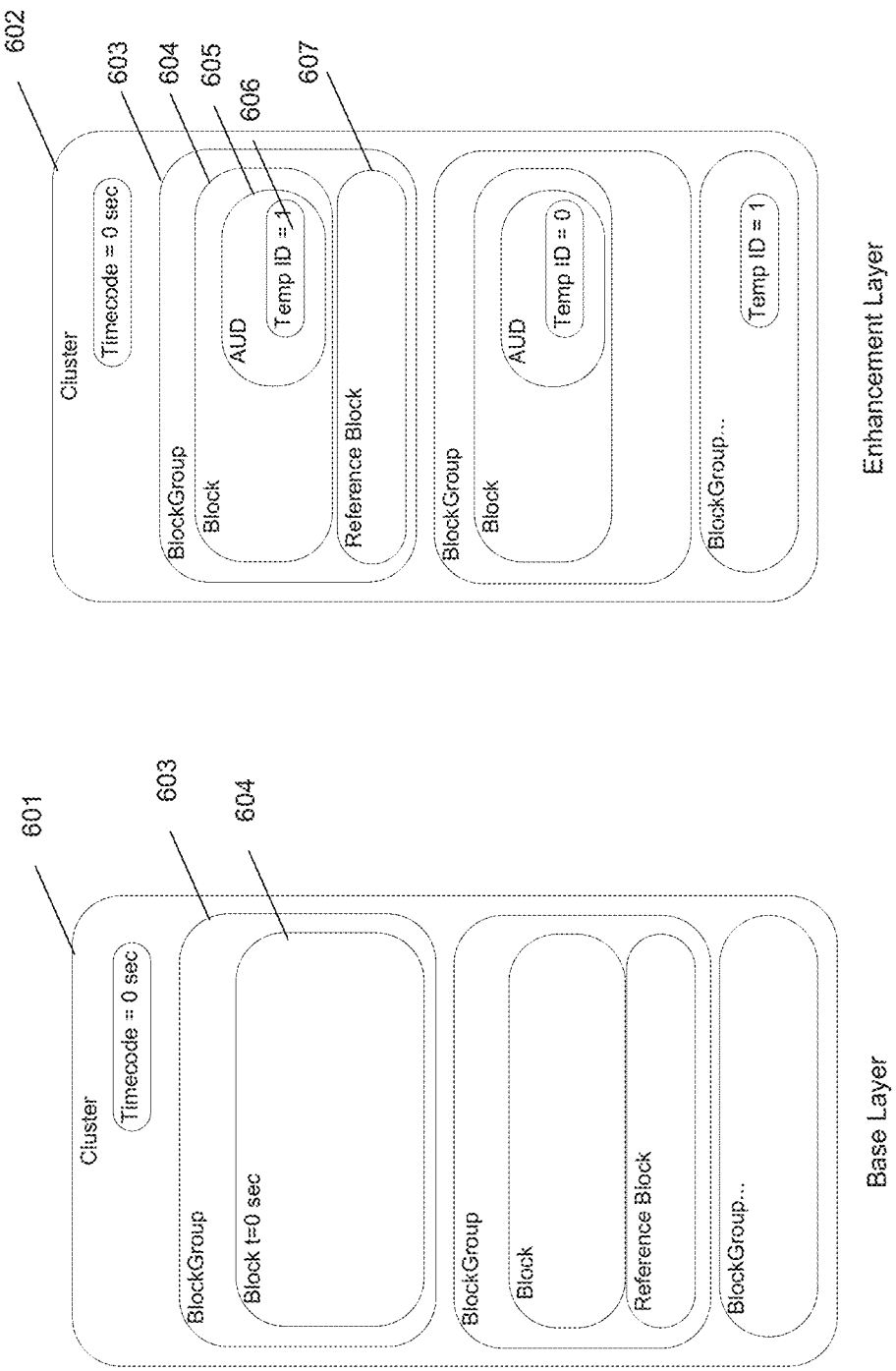
FIG. 6 conceptually illustrates an example of separate container files storing different temporal layers in accordance with an embodiment of the invention.

An example of separate container files storing different temporal layers is illustrated in FIG. 6. In particular, FIG. 6 illustrates two container files 601 and 602, with each container file storing a particular temporal layer of an encoded video. The example illustrated in this figure illustrates the Cluster element of the Matroska container file, which, as described above, is used to store a particular duration (e.g., 2 seconds) of encoded video. Furthermore, each Cluster includes numerous BlockGroups 603, each containing a Block element 604 and (optionally) associated an Reference Block(s) 607, with each Block corresponding to a particular video frame displayed within the particular duration of encoded video. Furthermore, each Block element of the container file containing the enhancement layer 602 includes an AUD 605 containing the Temporal ID 606 of the particular Block element 604, which may or may not contain video data for an access unit depending upon whether the Temporal ID indicates that the Block is part of the enhancement layer. The Temporal ID identifies the particular temporal layer corresponding to the Block.

In order to separate the temporal layers into separate streams, many embodiments can store within a particular container file only those video frames that have a Temporal ID identifying the particular temporal layer. As illustrated in this example, Cluster 601 includes Blocks and Reference Blocks which all have a Temporal ID of 0, which indicates that the encoded video frame within these Blocks correspond to the base temporal layer. In the illustrated embodiment, these Blocks do not include AUDs. In other embodiments, the Blocks in the container file containing the base layer can include AUDs. Likewise, Cluster 602 includes Blocks (and ReferenceBlocks) which all have a Temporal ID of 1, which indicates that the encoded video frames within these Blocks belong to an enhancement layer with and ID of 1. As noted above, the container file containing the clusters that include the enhancement layer(s) can also include Blocks containing AUDs indicating the decode order of the merged layers (see discussion below). In many embodiments, storing the temporal layers in separate containers allows for the individual streaming of particular temporal layers, as requested by different devices with different playback capabilities. Although the above describes inserting information concerning the various temporal layers, and metadata identifying the frames belonging to the enhancement layers, similar techniques can be utilized to stored encoded video incorporating enhancement layers in any of a variety of different container files in accordance with embodiments of the invention.

Generating a Container File for Video Encoded with Temporal Layers

Figure 7:
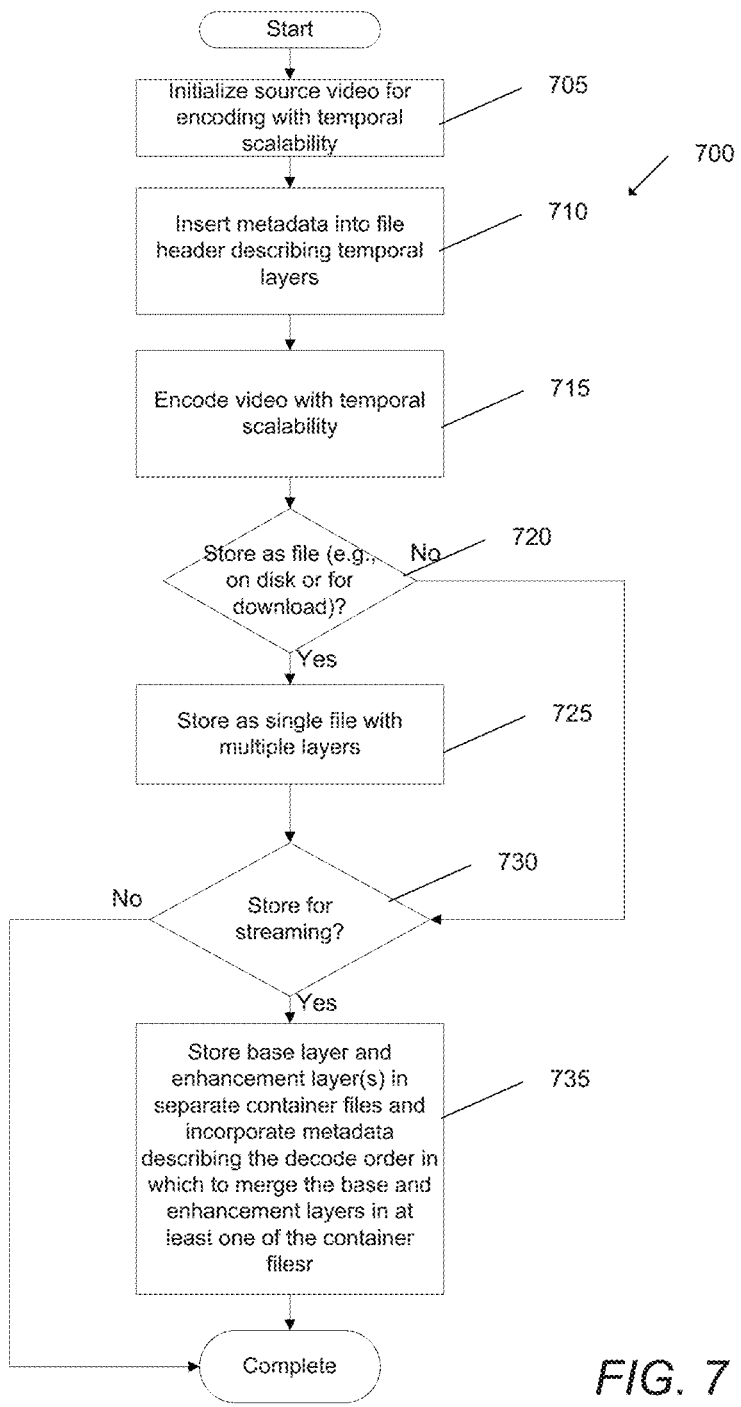
FIG. 7 is a flow chart illustrating a process for embedding information describing video encoded with temporal scalability in a container file in accordance with an embodiment of the invention.

In order to facilitate the playback of encoded video with temporal scalability, metadata describing the temporal layers of the encoded video may be embedded that facilitates the playback of the encoded video at different frame rates. The metadata may be embedded in either the container file or within the encoded video data. In many embodiments, the video is encoded in accordance with the HEVC standard and an encoder can embed certain additional information during the encoding process that facilitates the video playback. A process for embedding information describing video encoded with temporal scalability in a container file in accordance with an embodiment of the invention is illustrated in FIG. 7.

The process 700 commences by initializing (705) source video for encoding with temporal scalability. The resulting encoded video may contain multiple video layers, including a base layer containing frames of video for playback at a base frame rate and one or more enhancement layers containing frames of video for playback at a higher enhanced frame rate. In some embodiments, the same process will be utilized for encoding a video without temporal scalability (i.e., no multiple temporal layers). In this situation, the process may provide an indication that the enhancement layers are unavailable.

The process inserts (710) metadata into the container file indicating the presence of one or more enhancement layers within the file and the frame rate of the enhancement layer. In the case of a Matroska container file, a Profile Message can be inserted into the file header that includes information regarding the temporal layers and the corresponding frame rate of each layer. In many embodiments, the Profile Message is the DivX HEVC Profile Message specified by DivX, LLC of San Diego, Calif. In other embodiments, any of a variety of metadata describing an enhancement layer can be stored in a container file as appropriate to the requirements of a specific application.

The process 700 encodes (715) the video with temporal scalability. As described above, in many embodiments the process utilizes the HEVC compression standard for encoding the video. During the encoding process, the process may store portions of the encoded video within Matroska container files. As described above, in some embodiments, the process may also embed an Access Unit Delimiter (AUD) within each frame of video that provides the corresponding temporal layer associated with the video frame. In some embodiments, the AUD is contained within the Block (or Reference Block) element of the MKV container, with each Block containing the encoded video frame data for a particular video frame. In other embodiments, the process may not embed the AUD into the Block, but can use a different mechanism in order to provide an indication of the temporal layer associated with a particular frame of video. For example, in many embodiments that store the temporal layers in different containers, the process may provide null values to indicate that Blocks in different containers corresponding to different temporal layers will contain the video data for certain frames.

The process 700 determines (720) whether to store the encoded video as one or more files, such as a single MKV file. The file may then be stored on a non-volatile storage medium such as a CD-ROM, flash-drive, or other storage medium. The file may also be stored and distributed to a user by allowing the user to download the file from a distribution server. If the process determines that the encoded video is to be stored as a file, the process can store (725) the file containing the encoded video on a storage medium (i.e., Distribution Server or CD-ROM, flash-drive, or other non-volatile storage etc.). In many embodiments, the encoded video is stored as a single file with multiple temporal layers of video that can be decoded by a decoder implemented on the playback device. In several other embodiments, each temporal layer of the encoded video is stored as a separate file in order to allow a playback device to obtain only the encoded video that the device is capable of playing back.

The process 700 determines (730) whether to store the encoded video in a manner suitable for streaming to playback devices. When the process determines (730) not to store streams of the encoded video, the process is complete.

When the process 700 determines (730) that the encoded video should be stored for streaming, the process generates and stores (735) separate streams of frames of video, with each stream corresponding to a temporal layer of the encoded video. In many embodiments, in order to generate the separate streams, the process analyzes a Temporal I.D. associated with each frame of video in the single video stream. In several embodiments, the video stream will include many different video frames with the frames ordered based on the decoding order.

In a number of embodiments, the Temporal I.D. may be stored within the AUD of a Block element within a Matroska container. Based on the Temporal I.D. of the frames of video, the process may separate out different frames of video to different streams. Thus each separate stream may contain only the video data for frames of video within the particular stream. For example, the base layer may contain only the video data for frames that are to be played back at the base frame rate. Thus, if a video has a base frame rate of 30 f.p.s, the base layer will contain 30 frames for one second of encoded video. Continuing with the example, the one or more enhancement layers can contain the video data for the frames that are to be played back at the higher enhanced frame rate. Thus, if a video is to be played back at an enhanced frame rate of 60 f.p.s. and has a base frame rate of 30 f.p.s., the enhancement layer of this encoded video will contain 30 additional video frames that can be combined with the 30 frames in the base layer to generate an output of 60 f.p.s. As described below, the combined frames may be provided to the decoder in a particular decode order, which is an order that causes the decoder to have fully decoded all frames on which a given frame depends prior to decoding the given frame. In order to know how the frames are to be merged, the process also retains (735) the AUD order of frames within at least one of the layers. In many embodiments, metadata describing the ordering of frames is stored in at least one of the enhancement layers. For example, prior to separating the frames to the different streams, the process can retain the order of the layers of the frames within the single stream. During the merging of the frames, the process can then identify the corresponding layer that contains the frame that should be retrieved for the encoded video. After generating and storing the separate streams, the process is complete. Although specific processes for embedding information describing video encoded with temporal scalability are described above, any of a variety of processes may be utilized for embedding information describing video encoded with temporal scalability as appropriate to the requirements of specific applications in accordance with embodiments of the invention.

Playback of Encoded Video at Different Frame Rates

Figure 8:
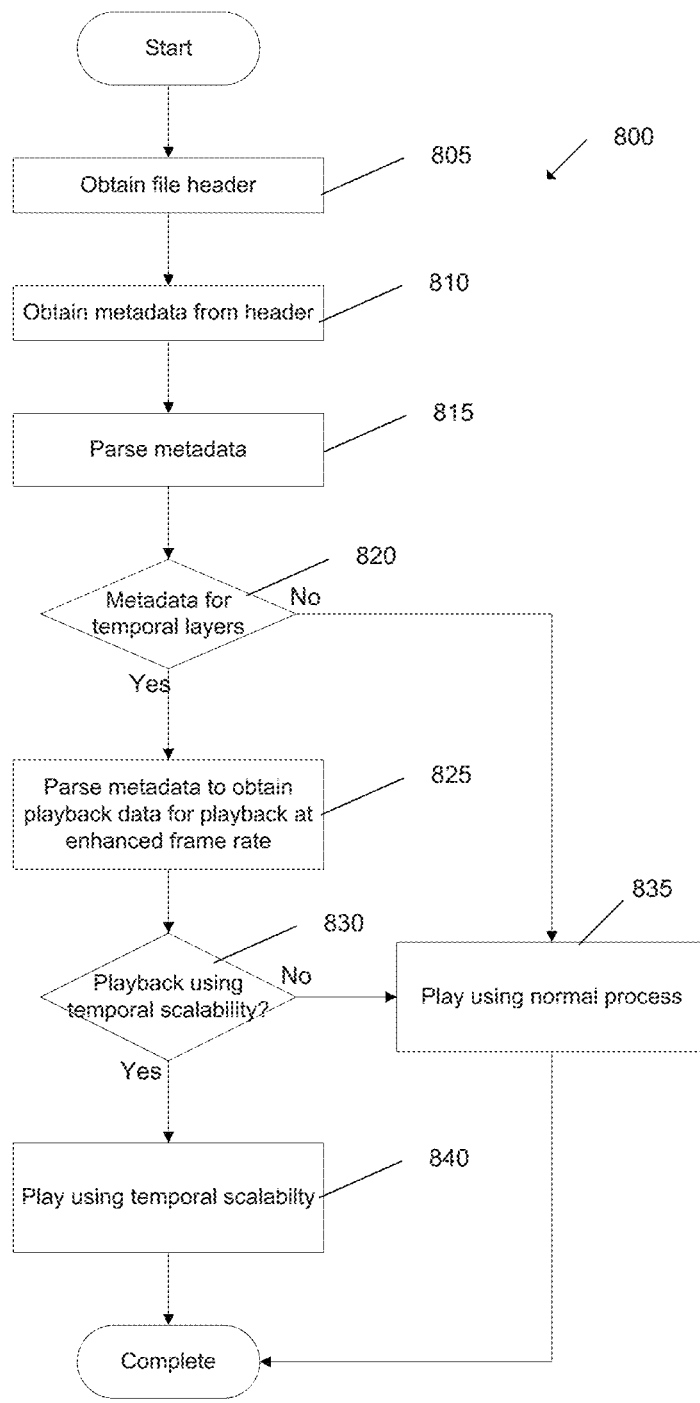
FIG. 8 is a flow chart illustrating a process for playing back encoded video including temporal layers in accordance with an embodiment of the invention.

Playback of encoded video with temporal scalability can allow the encoded video to be played back at different frame rates. A process for playing back an encoded video including temporal layers in accordance with an embodiment of the invention is illustrated in FIG. 8. The process 800 commences by obtaining (805) a file header for the encoded video that is to be played back on the playback device. As described above, in many embodiments the encoded video is stored in one or more Matroska container files, and the header of the Matroska container file may contain information regarding the encoded video contained within the particular container. The information stored within a Matroska container may be organized within different elements to facilitate the easy retrieval of the information when needed for playback of the encoded video. In particular, the process can access different elements to obtain different types of information that may be needed for playback. In other embodiments, any of a variety of container file formats appropriate to the requirements of a specific application can be utilized.

Metadata is obtained (810) from the header, which describes the various tracks within the encoded video. The metadata can be parsed (815) to retrieve information regarding the particular codec (i.e., compression/decompression standard) that was used to encode the video. In embodiments where the encoded video data is contained within a Matroska container file, the metadata is contained within a Codec Private element contained within a Tracks element. In many embodiments, the codec may be a codec provided by DivX, LLC of San Diego, Calif.

The metadata within the header of the container file may contain metadata that describes the temporal layers of the encoded video. If the process does not detect (820) metadata that describes temporal layers of the encoded video, the process plays back (835) the encoded video using a standard normal playback process. This would occur for a video that has been encoded without temporal scalability (i.e., there is only a single base layer of video frames). In many embodiments, the standard playback process decodes the video frames within a single track of video data contained in the container file.

If the process detects (820) metadata that describes the temporal layers of the encoded video, the metadata can be parsed (825) in order to obtain information that can be used to facilitate the playback of the encoded video at an enhanced frame rate. The obtained information can indicate whether or not the video is encoded with temporal scalability (i.e., there are multiple layers of video data). In particular, the metadata can describe the layers that are available in the encoded video and the particular frame rate of each layer. In a streaming environment, the metadata may also describe other temporal scalability streams contained within different container files. In embodiments where the encoded video data is contained within a Matroska container file, the metadata that describes the temporal layers of the encoded video can be contained within a Profile Message element within a Codec Private element. In other embodiments, metadata describing the temporal layers of the encoded video can be inserted in any of a variety of locations and/or data formats within a container file and/or other file type including (but not limited to) top level index files and/or metadata files as appropriate to the requirements of specific applications.

When the process (830) does not detect temporal scalability (i.e., the process does not detect the existence of multiple layers in the encoded video), the process plays (835) the encoded video using standard playback. When the process detects (830) temporal scalability (i.e., multiple available temporal layers), the process can play back (840) the encoded video with temporal scalability. In particular, the process plays back the encoded video either the full frame rate (e.g., 60 fps) or only at the base frame rate (e.g., 30 fps). Furthermore, for a file-based playback, the device on which the process will play back the encoded video can quickly determine which frames can be decoded by the device based on the temporal I.D. of each frame. Likewise, as described in detail below, during a streaming playback session involving separate streams for different temporal layers, the process can merge the separate streams corresponding to the different temporal layers into a single stream of encoded video prior to providing the stream to a decoding process. Various mechanisms for separating and merging streams of video data to achieve temporal scalability in accordance with embodiments of the invention are described in detail further below.

Playback of Encoded Video with Separate Streams

Figure 9:
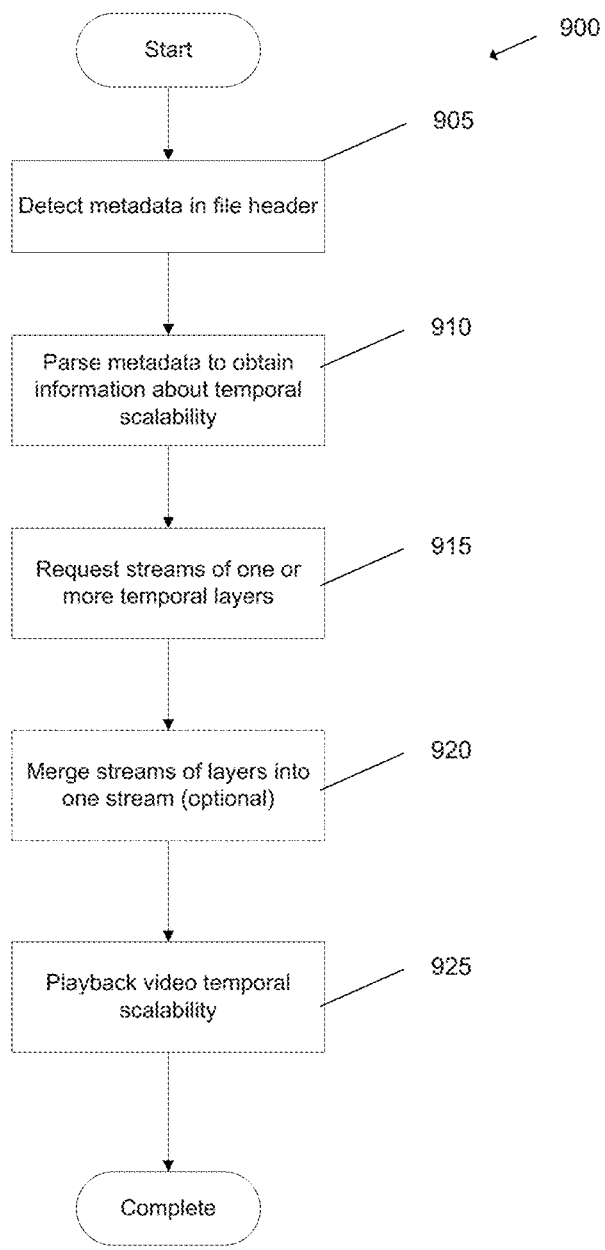
FIG. 9 is a flow chart illustrating a process for streaming different layers of encoded video using separate streams in accordance with an embodiment of the invention.

As described above, in many embodiments the video is encoded with one or more temporal layers, with each layer stored in a separate stream. In a distribution channel that streams the encoded video to playback devices, the separate streams allow different playback devices the ability to request only those streams that the particular playback device is capable of decoding and playing back. An example of a process for streaming encoded video utilizing separate streams in accordance with an embodiment of the invention is illustrated in FIG. 9. In this example, several of the steps in the process are similar to the steps described for both the file-based and stream-based distribution that were described in FIG. 8, and thus many of the details described in FIG. 8 are not provided in this example.

The process 900 initially detects (905) the presence of metadata within a header of the container file containing information about the temporal scalability of the encoded video. In embodiments that utilize a Matroska container file, the metadata can take the form of a Profile Message element similar to the various Profile Messages described above with respect to FIG. 4B. The metadata is parsed (910) to obtain information about the temporal scalability of the encoded video, including the number of available temporal layers and the frame rate of each layer.

Based on the playback capabilities of the device (i.e., the device's video profile), the process requests (915) streams for one or more of the temporal layers from a distribution server. In some embodiments, when the process requests only the base layer of the encoded video for playback at the base frame rate, the distribution server streams only the base layer. When the process requests the base layer and or more enhancement layers, the distribution server also streams each different temporal layer of the encoded video.

Based on whether the process has requested (i) only the base layer or (ii) the base layer and one or more enhancement layers, the process may need to merge 920 (optional) the streams of temporal layers into a single stream of frames in decode order (as opposed to playback order). In several embodiments, at least one of the layers includes metadata indicating the decode order of the frames in the base layer and the one or more enhancement layers. In embodiments in which the video is encoded in accordance with the HEVC standard, the metadata indicating decode order is a sequence of AUDs that indicate the temporal layer from which to retrieve encoded video data. The separate streams can then be merged 720 based on the AUD order contained within the one (or more) layers described above. In certain embodiments, the sequence of AUDs is contained in at least one of the enhancement layers. In other embodiments, decode order can be indicated in any of a variety of ways appropriate to the requirements of specific applications including (but not limited) by specifying the decode order of access units within metadata accompanying the access units in the container file and/or inserting null or empty access units in the container file of one of the layers.

When the process only requests a single temporal layer, the process can skip the optional merge (920) and playback (925) the encoded video. Furthermore, in many embodiments, the distribution server can merge the separate streams into a single stream prior to distributing the encoded video to a playback device. In this situation, the process may also playback (925) the encoded video without executing the optional merge (920) in the process. After playback, the process is complete. The process of merging the separate streams containing the different temporal layers may be performed by either (i) the playback device after it receives the separate streams from the distribution server or (ii) the distribution server prior to sending a single stream containing the multiple temporal layers to the playback device. Although specific processes for playback of an encoded video containing separate streams are described above, any of a variety of processes may be utilized for playback of an encoded video containing separate streams as appropriate to the requirements of specific application in accordance with embodiments of the invention. An example of a process of many embodiments for merging separate streams is described below.

Combining Separate Streams Based on Aud Order

Figure 10:
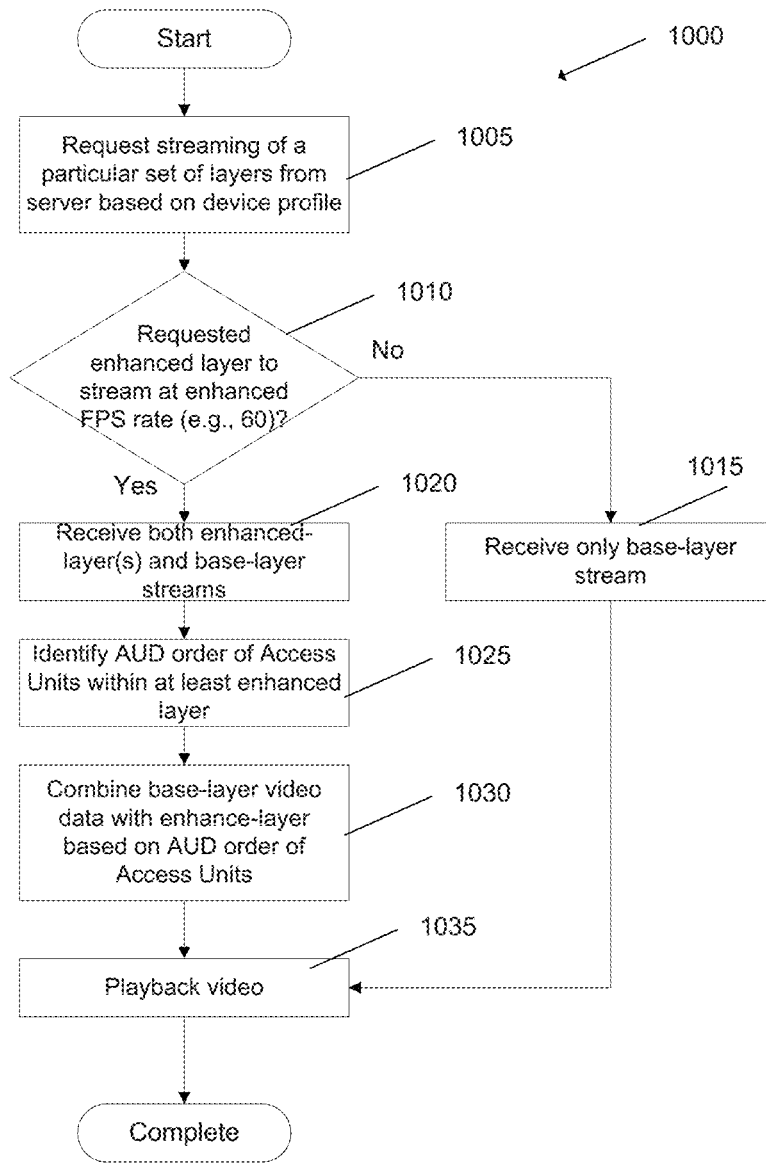
FIG. 10 is a flow chart illustrating a process for merging separate streams of an encoded video in accordance with an embodiment of the invention.

As described above, in a streaming context, each temporal layer of the encoded video may be stored as a separate stream and different streams may be provided to different playback devices to reduce wasteful network consumption. An example of a process for merging separate streams of an encoded video in accordance with an embodiment of the invention is illustrated in FIG. 10.

The process 1000 requests (1005) streaming of a particular set of temporal layers from a distribution server. In some embodiments, the process requests the set of streams based on the playback capabilities of the playback device. In particular, when a playback device does not have the playback capability to handle the enhancement layer(s), the process requests (1005) only the encoded video within the base layer, receives (1015) a stream containing video data from only the base layer of the encoded video, and plays back (1035) the encoded video.

When (1010) the playback device has the ability to decode and playback one or more of the enhancement layers, the process requests both the base layer and enhancement layer(s). The process then receives (1020) separate streams containing the base layer and the one or more enhancement layers. The process then may need to combine the separate streams into a single stream prior to providing the stream to the decoder on the playback device. In order to combine the streams, the process identifies (1025) an AUD order for the video frames (i.e., Access Units), and determines the temporal layer associated with each frame of video. In many embodiments, the AUD order may be obtained from at least one of the layers. The AUD order identifies the order of video frames and the particular temporal layer that contains the video frame. In particular, each frame (e.g., Matroska Block described above) can be embedded with an AUD containing a Temporal I.D. that identifies a particular layer for the frame. The order that these frames are separated into separate streams may be retained within one of the temporal layers. For example, an AUD order may simply be a series of 1's and 0's, such as "001101 . . . ", which would indicate that the order of frames (prior to being separated into separate streams) is: "base layer, base layer, enhancement layer, enhancement layer, base layer, enhancement layer, . . . " etc.

Thus each separate layer can be recombined by selecting frames from the different temporal layers based on the AUD. In particular, an AUD with Temporal I.D. of 0 means that the process needs to merge the next frame of the base layer stream and an AUD with Temporal ID of 1 means that the process needs to merge the next frame of the particular enhancement layer stream with Temporal ID of 1. By retaining the original Temporal ID order of the video frames, the process is able to easily re-combine (1030) the base layer video data with the enhancement layer video data into a single stream of encoded video.

Having combined the separate streams, the process plays back (1035) the encoded video. After playback, the process is complete. Although specific processes for merging separate streams of an encoded video are described above, any of a variety of processes may be utilized for merging separate streams of an encoded video as appropriate to the requirements of specific application in accordance with embodiments of the invention. Several additional examples are provided below that illustrate the merging of separate streams of an encoded video.

Decoding Order of Frames

As described above, in order for a decoder to decode a given video frame, in some embodiments, the decoder of a playback device needs to have fully decoded all frames on which the given frame depends prior to decoding the given frame. FIGS. 11A and 11B illustrate an example of the decoding a set of video frames ordered in a decode order. In particular, FIG. 11A illustrates the reference dependencies that may exist between a set of video frames ordered based on the picture display order (POC) of the video frames. The POC of a frame provides the position of a given frame relative to the display order of the other frames in the same portion of encoded video, such as a Matroska Cluster element that encodes a 2-second duration of encoded video.

As illustrated, the arrows between the various frames 1110 indicate the other frames on which the particular frame is dependent. As illustrated, POC 0 does not have any outward arrows, since this is an I-frame and thus is not dependent on any other frames for its decoding. The next POC 1 is dependent on frames POC 0 and POC 2. Thus, in order for a decoder of a playback device of some embodiments to be able to decode POC 1 video frame, the decoder should have already decoded POC 0 and POC 2. Likewise, POC 2 is dependent on POC 0 and POC 4; POC 3 is dependent on POC 2 and POC 0; POC 4 is dependent on POC 0 and POC 8; and these dependencies continue for each B or P frame in the particular portion of encoded video. Thus in order to decode these video frames within the particular portion of the encoded video, the frames are provided to the decoder in an order that guarantees that for a given frame, the decoder has already decoded all frames on which the given frame depends prior to decoding the given frame. Thus the decode order for these frames is not the same as the POC order (i.e., 0, 1, 2, 3, etc.) of the frames.

FIG. 11B illustrates a table providing the required decode order for the frames illustrated in FIG. 11A. In particular, the decode order for the frames is as follows: POC 0, POC 8, POC 4, POC 2, POC 1, POC 3, POC 6, POC 5, and POC 7. Furthermore, the table also provides the Temporal ID, indicated as "Tid" for each frame. As described above, in many embodiments the Temporal ID is embedded within each frame of the encoded video. For example, the Temporal ID may be embedded within the Block element (i.e., frame) of the MKV container. In this example, the AUD temporal ID order of the set of frames is: 0, 0, 0, 0, 1, 1, 0, 1, 1. Thus during merging of the separate streams, this AUD temporal ID order may be used to determine the order in which the frames from the different streams need to be combined for the decode order.

Furthermore, the Temporal ID associated with each frame of an encoded video can be used to quickly separate the temporal layers into different streams. An example of separating an encoded video into separate streams in accordance with an embodiment of the invention is illustrated in FIGS. 12A-12B.

FIG. 12A illustrates an example of a portion of an encoded video stream containing several frames of video (0 through 8). The frames are ordered based on the decode order of the video. In particular, the decode order for this portion of the video is POC 0, 8, 4, 2, 1, 3, 6, 5 and 7. Each POC also includes an AUD (i.e., Access Unit Delimiter) that contains a Temporal ID identifying the temporal layer for the frame of video. For example, POC 0 has a TID of 0, POC 8 has a TID of 0, and this continues along the stream of encoded video. As noted above, the Temporal ID can be used to separate the frames into separate streams.

FIG. 12B illustrates an example of the separate streams that may be generated for the encoded video illustrated example illustrated FIG. 12A. In particular, the stream 0, 8, 4, 2, 1, 3, 6, 5, and 7 needs to be separated into a stream containing only frames for the base layer (i.e., Temporal ID of 0) and a stream containing only frames for the enhancement layer (i.e., Temporal ID of 1). As illustrated, the first frame (POC 0, TID 0) is separated to the base layer because it has a TID of 0, the second frame (POC 8, TID 0) is separated to the base layer (which now contains the frames 0, 8), the third frame (POC 4, TID 0) is again separated to the base layer (which now contains the frames 0,8,4), the fourth frame (POC 2, TID 0) is again separated to the base layer (which now contains the frames 0,8,4,2), now at the fifth frame (POC 1, TID 1) this frame is separate to the enhancement layer because it has a TID of 1. At this point, the base layer 12B10 has frames POC: 0,8,4,2 and the enhancement layer 12B20 has frame POC: 1. This process continues on through the frames of encoded video. For this portion of frames, the stream 12B10 corresponding to the base layer with Temporal ID of 0 contains the frames: 0, 8, 4, 2, and 6. Likewise, stream 12B20 corresponding to the enhancement layer with Temporal ID of 1 contains the frames 1, 3, 5, and 7. Having separated the frames for the different temporal layers into separate streams, these streams 12B10 and 12B20 can now be individually streamed to different devices, as requested by the devices. Furthermore, as described above, information regarding the AUD Temporal ID order of the frames can also be streamed, for example within one of the temporal layers or as a separate metadata, for use during the merging of the separate streams prior to playback on the device.

Figure 13:
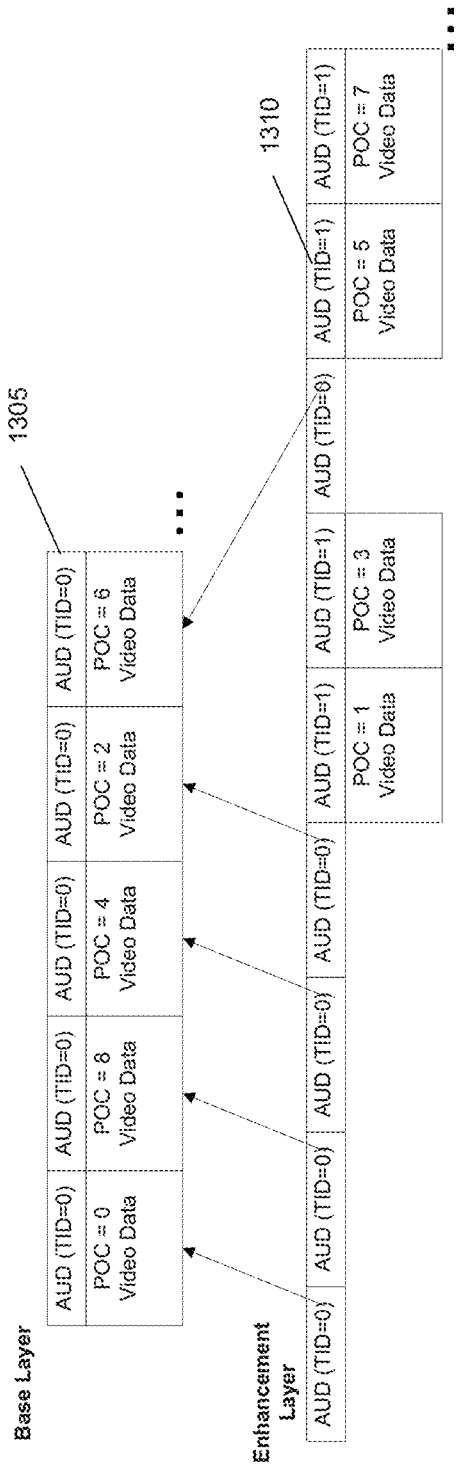
FIG. 13 conceptually illustrates merging of different temporal streams in accordance with embodiments of the invention.

An example of merging of different temporal streams in accordance with an embodiment of the invention is illustrated in FIG. 13. In particular, FIG. 13 illustrates a stream 1305 corresponding to the base temporal layer and a stream 1310 corresponding to the enhancement layer. These streams correspond to the streams that were separated in FIGS. 12A-12B. In particular, stream 1305 includes the video frames (illustrated as POC Video Data) for POCs: 0, 8, 4, 2, and 6. Likewise, stream 1310 includes the video frames for POCs 1, 3, 5 and 7. Accordingly, in this example, each stream 1305 and 1310 has the video data for video frames associated with its particular temporal layer. Furthermore, in this particular example, stream 1310 also includes the AUD Temporal ID order, which can be used to merge the separate streams into a single stream.

In particular, the AUD Temporal ID order in this example is: 0, 0, 0, 0, 1, 1, 0, 1, 1. As such, this AUD Temporal ID order indicates that the first AUD has a Temporal ID of 0, and thus the combined video stream needs to retrieve and merge the video data of the 1$^{st}$ frame (i.e., POC 0) from the base layer stream 1305. The next AUD Temporal ID is again 0, and thus again, the combined stream is able to retrieve and merge the video data of the next frame from the base layer (i.e., POC 8). This continues through the entire AUD Temporal ID series, and thus the stream is combined as a combined stream using the following order of POCs: 0, 8, 4, 2, 6, 1, 3, 6, 5 and 7. Note that the POC order is now back to the same order that it was prior to the separation of the layers into the separate streams illustrated in FIGS. 12A-12B.

The combined stream can now be provided to a decoder of the playback device for decoding of the video frames. Although the example in FIG. 13 illustrates combining different streams containing different temporal layers using an AUD Temporal ID order of the video frames, any of a variety of mechanisms may be utilized for merging separate streams of encoded video as appropriate to the requirements of specific applications in accordance with embodiments of the invention.

Furthermore, providing separate streams for the different temporal layers allows the system to stream the individual layers that are needed for a particular device. As described above, the different streams may be requested by a playback device using HTTP, which is a stateless protocol that enables a playback device to request a byte range within a file, or RTSP which is a network control protocol used to control streaming media servers whereby playback devices issue control commands, such as "play" and "pause", to the server streaming the media to control the playback of media files. When RTSP is utilized, the media server records the state of each client device and determines the media to stream based upon the instructions received from the client devices and the client's state. Examples of such streaming media servers are described below.

Streaming Server

Figure 14:
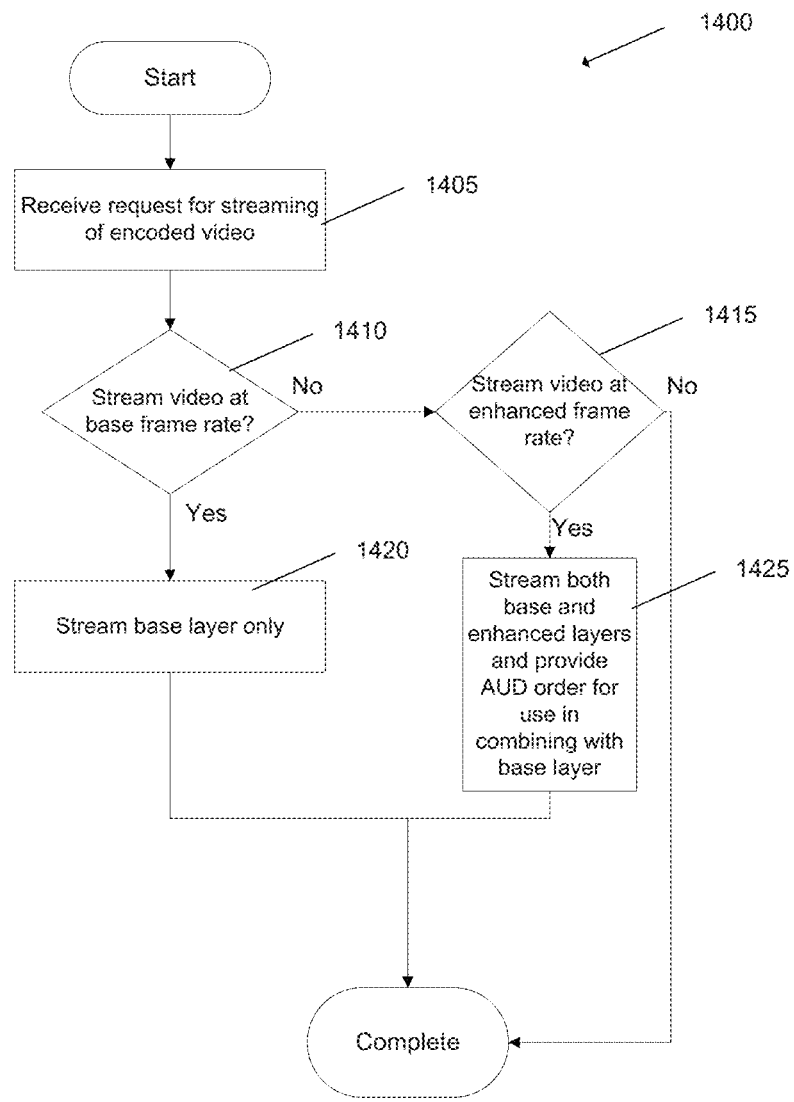
FIG. 14 illustrates streaming different temporal layers of an encoded video for playback in accordance with embodiments of the invention.

Playback devices may request different temporal layers of an encoded video with temporal scalability based on the particular playback capacities of the device. A process for streaming different temporal layers of an encoded video for playback on a playback device in accordance with an embodiment of the invention is illustrated in FIG. 14.

The process 1400 receives a request (1405) for streaming of an encoded video. In some embodiments, the request may be received from a playback device and include a particular video profile of the device. For example, the video profile may provide the frame rate at which the device is able to playback an encoded video.

The process determines (1410) whether to stream the video at a base frame rate. For example, if the playback device is only capable of decoding the base layer of the encoded video, the process streams only the base layer. In an adaptive bitrate context, the process may decide to stream at the base rate based on the given streaming conditions of the network such as the bandwidth available or the CPU capacity of the device for processing the video frames.

When the process determines (1410) to stream the encoded video at the base frame rate, the process streams (1420) only the stream containing the base layer of video frames. In some embodiments, the process maintains the state of the streaming being provided to the playback device. For example, the process may use RTSP to establish and control the video streams to the playback device. Likewise, the playback device can issue commands, such as play, pause, and stop, to enable the real-time control of playback of the streaming video. In other embodiments, the process is a stateless process such as HTTP.

When the process determines (1410) not to stream the video at the base frame rate, the process determines (1415) whether to stream the video at a higher enhanced frame rate. For example, if the profile of the playback device indicates that the device is able to playback video at the enhanced frame rate, the process streams (1425) both the stream for the base layer and the one or more streams for the enhancement layer. As described above, in several embodiments, the process may merge the separate streams and stream a single stream to the playback device while in other embodiments, the process may stream the streams as separate streams. In some embodiments, the playback device can merge the separate streams into the proper decode order for decoding by a decoder implemented on the playback device. After merging, the process is complete. If the process determines (1415) not to stream the video at the enhanced frame rate, the process is complete.

A specific process for streaming different temporal layers of an encoded video for playback on a playback device is described above, however, any variety of processes may be utilized for streaming different temporal layers of an encoded video for playback on a playback device in accordance with embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method of encoding video from a source video, comprising:
   receive video having a plurality of access units ordered in a decode order using at least one source encoding server system, wherein the decode order is an order that causes a decoder to have fully decoded all frames on which a particular frame depends prior to decoding the particular frame;
   encode the video into a set of layers comprising a base layer and at least one enhancement layer, wherein the encoding comprises: (i) using a temporal identifier of each access unit to determine a particular layer associated with the access unit and (ii) retaining as metadata the decode order of the temporal identifiers of the plurality of access units of the video using the at least one source encoding server system; and
   storing the set of layers into separate container files, wherein the enhancement layer is stored in a separate container file that also includes the metadata with the decode order of the temporal identifiers of the plurality of access units of the video;
   wherein the base layer comprises a sequence of frames encoded at a first frame rate such that frames in the base layer only depend upon other frames in the base layer;
   wherein the enhancement layer comprises additional frames that, when merged with the sequence of frames in the base layer, form a sequence of frames encoded at a second frame rate, and frames in the enhancement layer are encoded such that the frames in the enhancement layer only depend upon frames in the base layer; and
   wherein the enhancement layer comprises the metadata that is used to determine the decode order and that specifies the decode order for selecting access units from the base layer and the enhancement layer to combine the plurality of access units into a single video stream in the decode order.

2. The method of claim 1, wherein a temporal identifier of an access unit is stored in an initial set of bits of the access unit.

3. The method of claim 1, further comprising inserting a temporal identifier for a set of access units of the plurality of access units of the video.

4. The method of claim 1, further comprising inserting a metadata tag providing information regarding the layers available and the frame rate of each layer.

5. The method of claim 1, further comprising:
   receiving a request for streaming of the video;
   determining playback capabilities of a device requesting the video; and
   streaming different sets of layers of the video based on the playback capabilities of the device, wherein (i) the base layer is streamed to a playback device capable of playing back the base layer and (ii) the base layer and at least one enhancement layer is streamed to a playback device capable of streaming the plurality of layers.

6. The method of claim 5, wherein streaming the different sets of layers comprises merging the different layers using the retained order of the temporal identifiers of the plurality of access units of the video.

7. The method of claim 1, further comprising:
   receiving a request for downloading of the video from a playback device; and
   providing the encoded video to the playback device.

8. The method of claim 1, wherein the frame rate of the at least one enhancement layer is an integer multiple of the base layer.

9. The method of claim 1, further comprising storing each layer as a separate stream.

* * * * *